(12) United States Patent
Kim et al.

(10) Patent No.: US 12,593,138 B2
(45) Date of Patent: Mar. 31, 2026

(54) IMAGE SIGNAL PROCESSOR AND METHOD OF PROCESSING IMAGES

(71) Applicant: SAMSUNG ELECTRONICS CO., LTD., Suwon-si (KR)

(72) Inventors: Minoh Kim, Suwon-si (KR); Pilsu Kim, Suwon-si (KR); Daeho Lee, Suwon-si (KR); Jongseong Choi, Suwon-si (KR); Changhoon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 279 days.

(21) Appl. No.: 18/449,248

(22) Filed: Aug. 14, 2023

(65) Prior Publication Data

US 2024/0179423 A1 May 30, 2024

(51) Int. Cl.
| | |
|---|---|
| *H04N 23/81* | (2023.01) |
| *G06T 7/13* | (2017.01) |
| *G06T 7/90* | (2017.01) |
| *H04N 23/741* | (2023.01) |
| *H04N 23/84* | (2023.01) |

(52) U.S. Cl.
CPC .............. *H04N 23/81* (2023.01); *G06T 7/13* (2017.01); *G06T 7/90* (2017.01); *H04N 23/741* (2023.01); *H04N 23/84* (2023.01); *G06T 2207/10024* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 8,514,323 B2 | 8/2013 | Kino et al. | |
| 8,854,421 B2 | 10/2014 | Kasahara | |
| 9,704,269 B2 | 7/2017 | Dabral et al. | |
| 11,252,299 B1 * | 2/2022 | Wu | H04N 1/6058 |
| 11,375,131 B2 | 6/2022 | Dabral et al. | |
| 2008/0310751 A1 | 12/2008 | Rai et al. | |
| 2016/0037060 A1 * | 2/2016 | Lim | H04N 23/80 |
| | | | 348/241 |
| 2020/0211166 A1 | 7/2020 | Yao et al. | |

(Continued)

FOREIGN PATENT DOCUMENTS

| | | |
|---|---|---|
| KR | 10-2021-0009255 | 1/2021 |
| KR | 10-2023-0036282 | 3/2023 |

*Primary Examiner* — James M Hannett
(74) *Attorney, Agent, or Firm* — Morgan, Lewis & Bockius LLP

(57) ABSTRACT

An image signal processor includes a noise reduction circuit, a high dynamic range (HDR) circuit and post-processing circuit. The noise reduction circuit performs noise reduction operation on a plurality of exposure noise images each respectively corresponding to one of a plurality of brightness levels to generate a plurality of exposure clean images in a first operation mode and performs the noise reduction operation on a single noise image corresponding to one brightness level to generate a single clean image in a second operation mode. The HDR circuit merges the plurality of exposure clean images to generate an HDR image in the first operation mode. The post-processing circuit generates an output image by processing the HDR image or the single clean image.

18 Claims, 29 Drawing Sheets

10

(56)　　　　　　References Cited

U.S. PATENT DOCUMENTS

| | | | |
|---|---|---|---|
| 2020/0314289 A1* | 10/2020 | Wu | H04N 25/671 |
| 2021/0021751 A1* | 1/2021 | Lee | H04N 19/42 |
| 2022/0020122 A1 | 1/2022 | Kim et al. | |
| 2022/0198625 A1* | 6/2022 | McElvain | G06T 5/70 |
| 2023/0073138 A1 | 3/2023 | Lee et al. | |
| 2023/0164447 A1* | 5/2023 | Wang | H04N 25/134 |
| | | | 348/229.1 |

\* cited by examiner

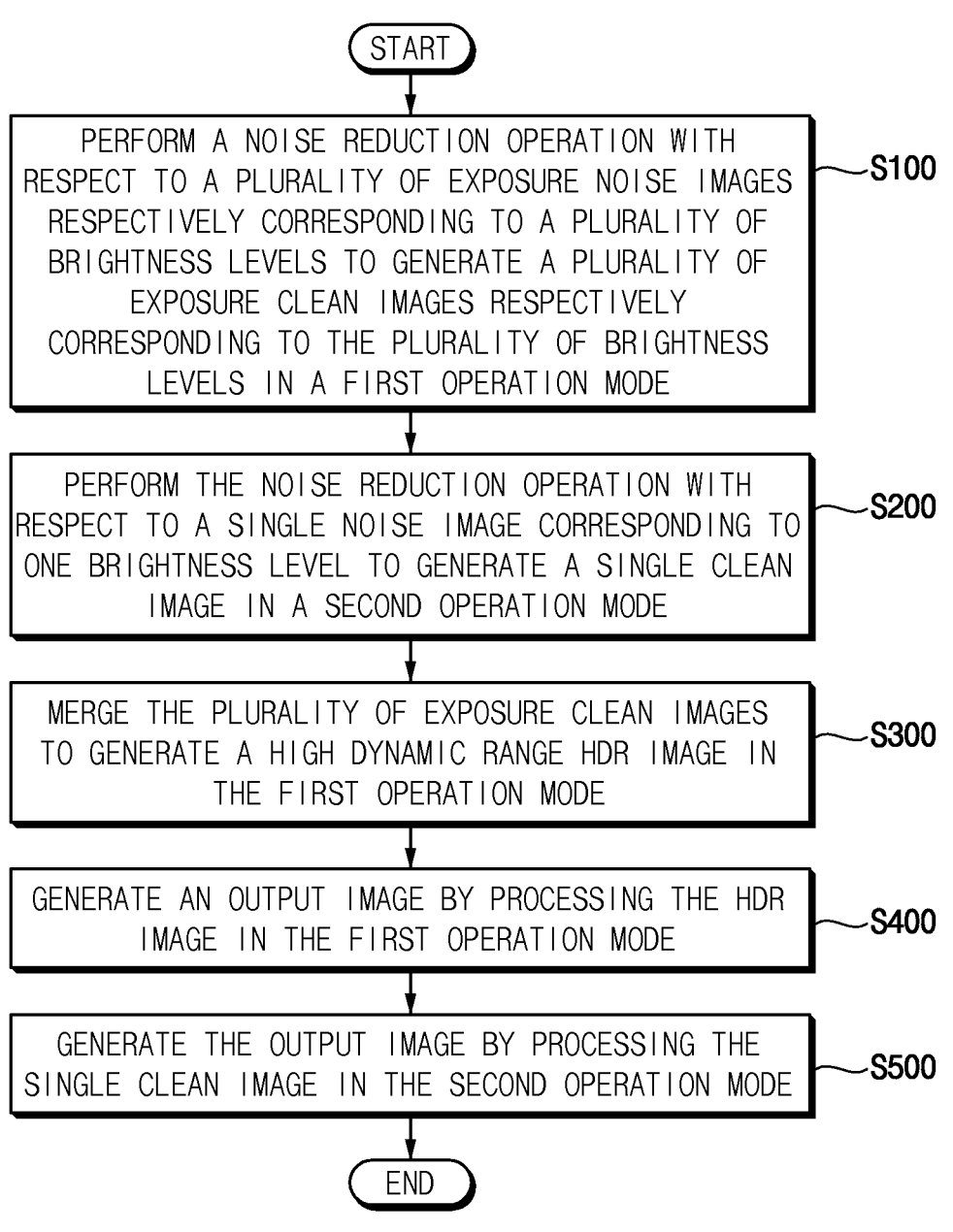

START

PERFORM A NOISE REDUCTION OPERATION WITH RESPECT TO A PLURALITY OF EXPOSURE NOISE IMAGES RESPECTIVELY CORRESPONDING TO A PLURALITY OF BRIGHTNESS LEVELS TO GENERATE A PLURALITY OF EXPOSURE CLEAN IMAGES RESPECTIVELY CORRESPONDING TO THE PLURALITY OF BRIGHTNESS LEVELS IN A FIRST OPERATION MODE — S100

PERFORM THE NOISE REDUCTION OPERATION WITH RESPECT TO A SINGLE NOISE IMAGE CORRESPONDING TO ONE BRIGHTNESS LEVEL TO GENERATE A SINGLE CLEAN IMAGE IN A SECOND OPERATION MODE — S200

MERGE THE PLURALITY OF EXPOSURE CLEAN IMAGES TO GENERATE A HIGH DYNAMIC RANGE HDR IMAGE IN THE FIRST OPERATION MODE — S300

GENERATE AN OUTPUT IMAGE BY PROCESSING THE HDR IMAGE IN THE FIRST OPERATION MODE — S400

GENERATE THE OUTPUT IMAGE BY PROCESSING THE SINGLE CLEAN IMAGE IN THE SECOND OPERATION MODE — S500

END

F I G. 3A
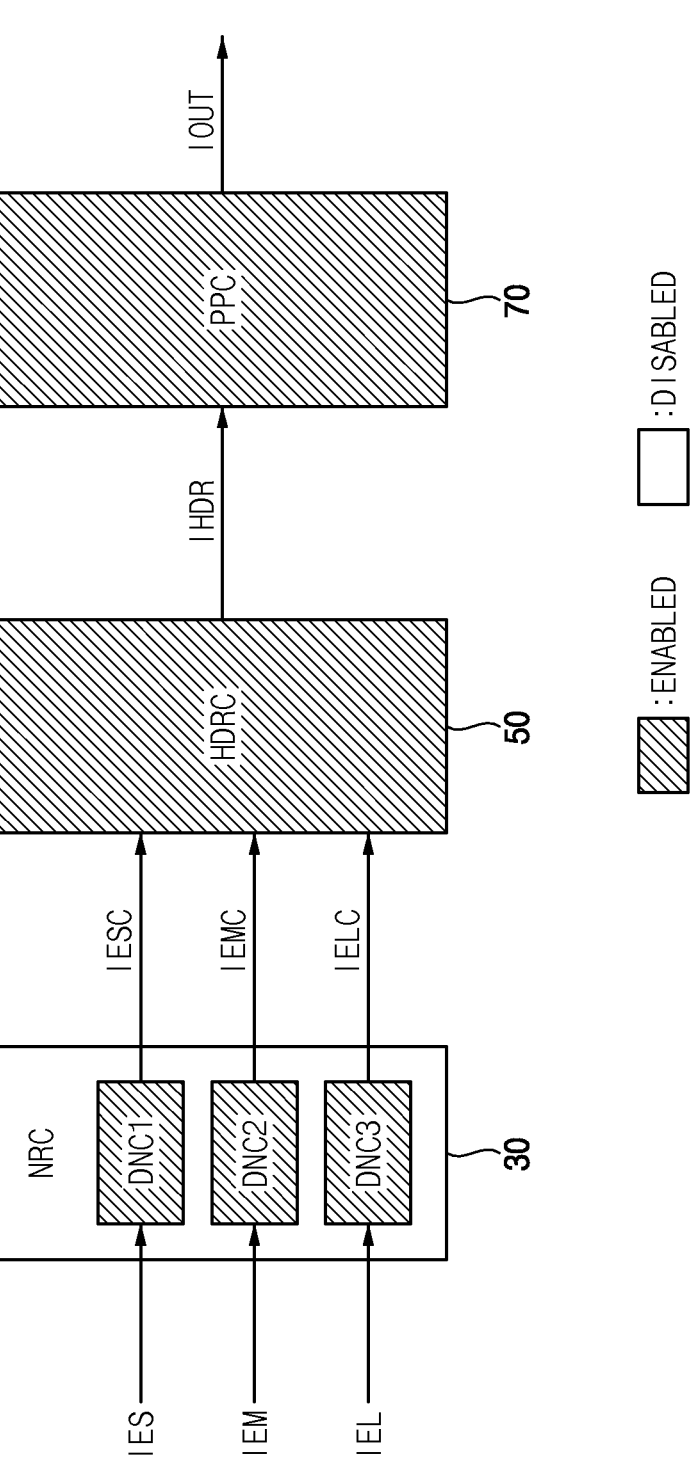

FIG. 3B

IES → NRC [ DNC1 | DNC2 | DNC3 ] 30 — IESC → HDRC 50 → PPC 70 → IOUT

▨ :ENABLED

☐ :DISABLED

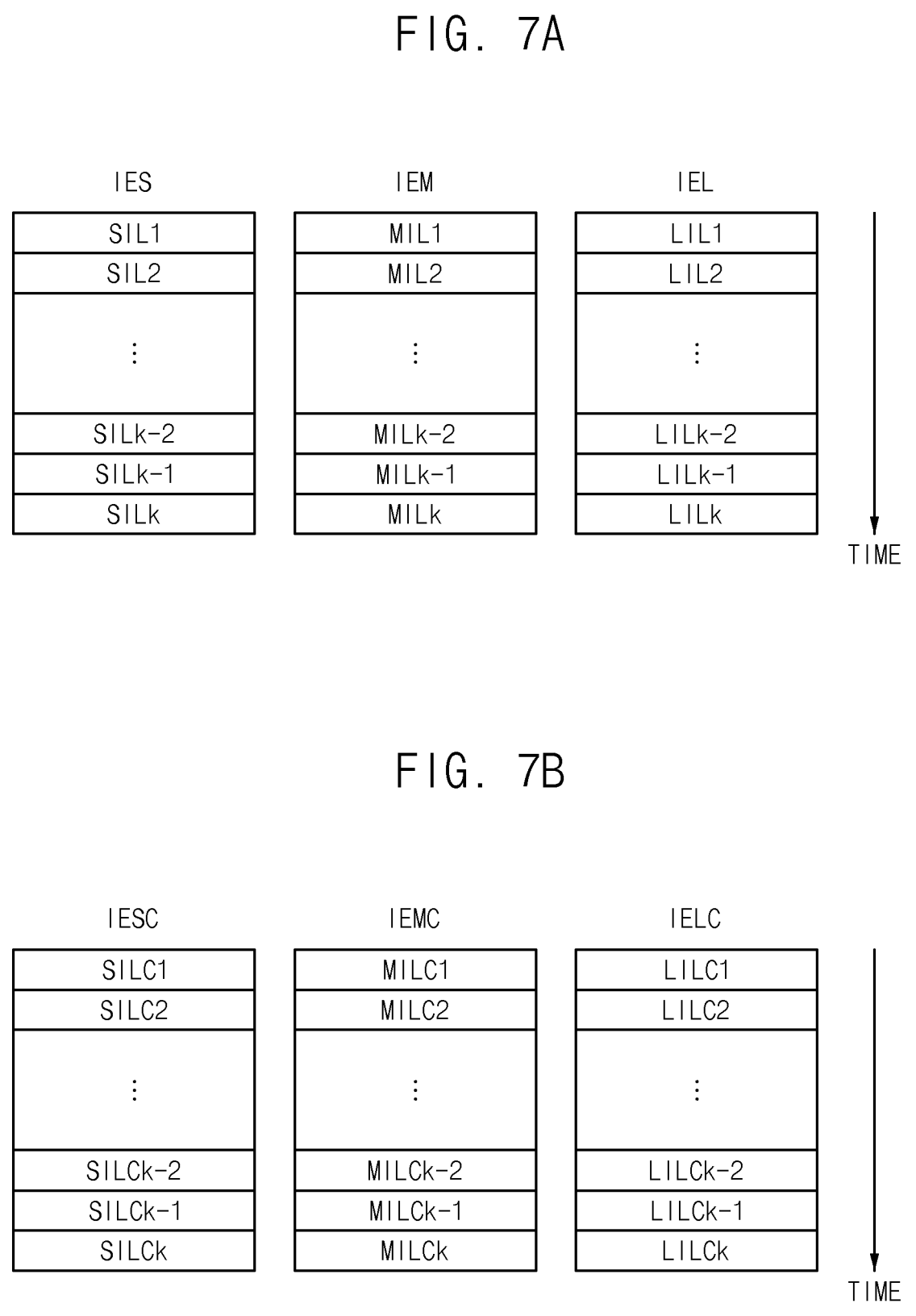

| IES |
| --- |
| SIL1 |
| SIL2 |
| ⋮ |
| SILk-2 |
| SILk-1 |
| SILk |

| IEM |
| --- |
| MIL1 |
| MIL2 |
| ⋮ |
| MILk-2 |
| MILk-1 |
| MILk |

| IEL |
| --- |
| LIL1 |
| LIL2 |
| ⋮ |
| LILk-2 |
| LILk-1 |
| LILk |

TIME

FIG. 7B

| IESC |
| --- |
| SILC1 |
| SILC2 |
| ⋮ |
| SILCk-2 |
| SILCk-1 |
| SILCk |

| IEMC |
| --- |
| MILC1 |
| MILC2 |
| ⋮ |
| MILCk-2 |
| MILCk-1 |
| MILCk |

| IELC |
| --- |
| LILC1 |
| LILC2 |
| ⋮ |
| LILCk-2 |
| LILCk-1 |
| LILCk |

TIME

FIG. 11

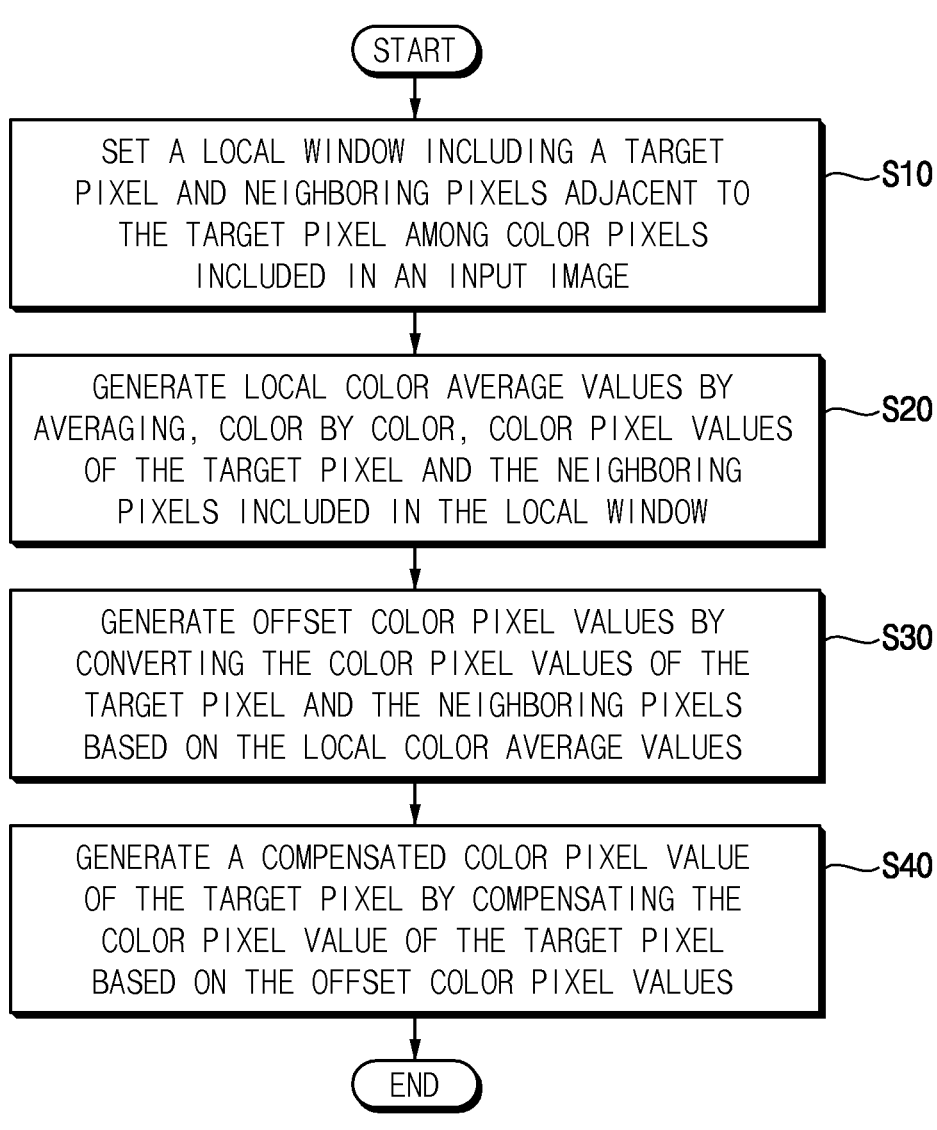

START

SET A LOCAL WINDOW INCLUDING A TARGET
PIXEL AND NEIGHBORING PIXELS ADJACENT TO
THE TARGET PIXEL AMONG COLOR PIXELS
INCLUDED IN AN INPUT IMAGE — S10

GENERATE LOCAL COLOR AVERAGE VALUES BY
AVERAGING, COLOR BY COLOR, COLOR PIXEL VALUES
OF THE TARGET PIXEL AND THE NEIGHBORING
PIXELS INCLUDED IN THE LOCAL WINDOW — S20

GENERATE OFFSET COLOR PIXEL VALUES BY
CONVERTING THE COLOR PIXEL VALUES OF THE
TARGET PIXEL AND THE NEIGHBORING PIXELS
BASED ON THE LOCAL COLOR AVERAGE VALUES — S30

GENERATE A COMPENSATED COLOR PIXEL VALUE
OF THE TARGET PIXEL BY COMPENSATING THE
COLOR PIXEL VALUE OF THE TARGET PIXEL
BASED ON THE OFFSET COLOR PIXEL VALUES — S40

END

620

| | | |
|---|---|---|
| UPTT | UPTT | UPTT |
| UPTT | UPTT | UPTT |
| UPTT | UPTT | UPTT |

PTT4

| R | W | G | W |
|---|---|---|---|
| W | R | W | G |
| G | W | B | W |
| W | G | W | B |

PTT3

| R | R | R | G | G | G |
|---|---|---|---|---|---|
| R | R | R | G | G | G |
| R | R | R | G | G | G |
| G | G | G | B | B | B |
| G | G | G | B | B | B |
| G | G | G | B | B | B |

PTT2

| R | R | G | G |
|---|---|---|---|
| R | R | G | G |
| G | G | B | B |
| G | G | B | B |

PTT1

| R | G |
|---|---|
| G | B |

FIG. 21

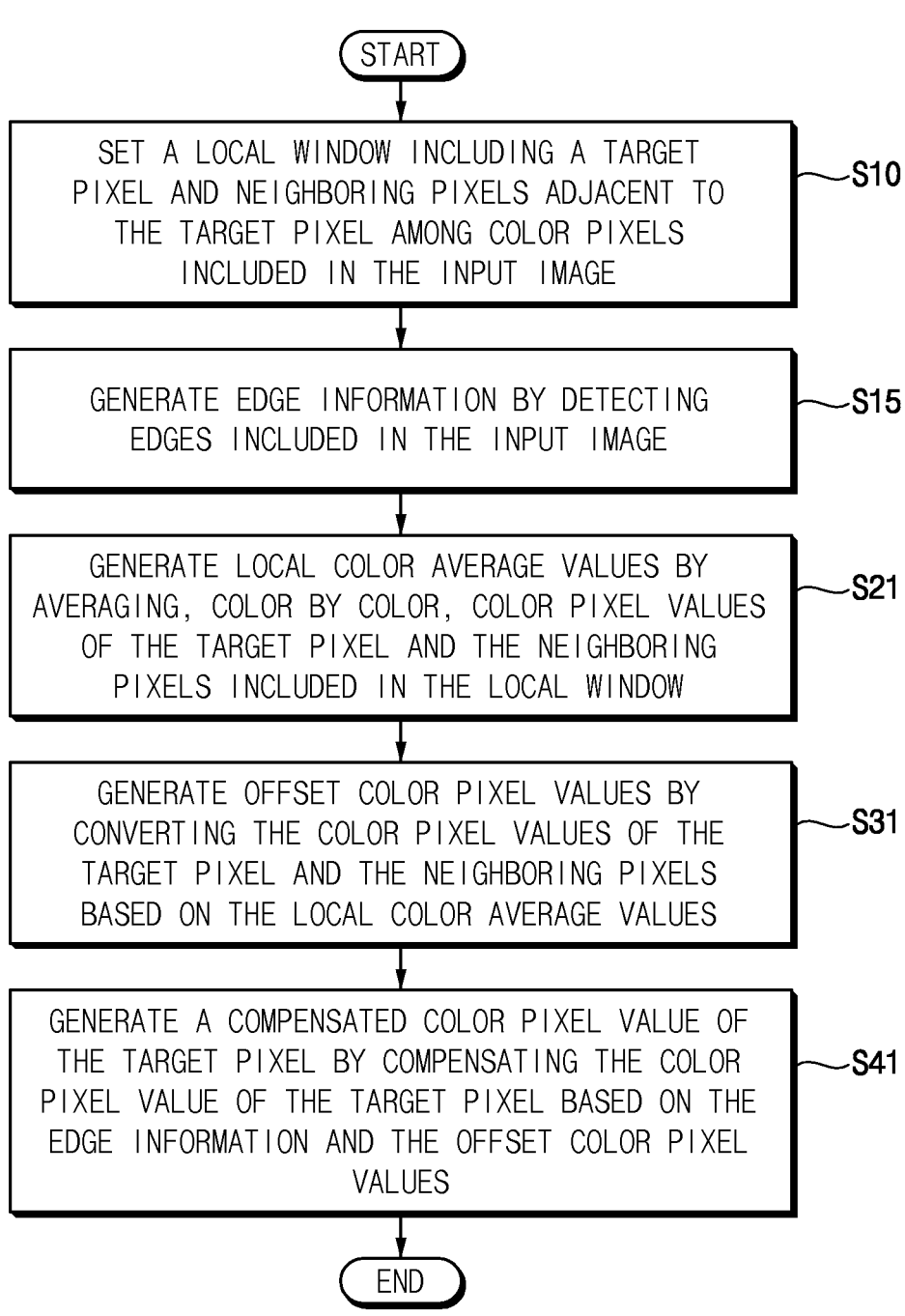

START

SET A LOCAL WINDOW INCLUDING A TARGET PIXEL AND NEIGHBORING PIXELS ADJACENT TO THE TARGET PIXEL AMONG COLOR PIXELS INCLUDED IN THE INPUT IMAGE — S10

GENERATE EDGE INFORMATION BY DETECTING EDGES INCLUDED IN THE INPUT IMAGE — S15

GENERATE LOCAL COLOR AVERAGE VALUES BY AVERAGING, COLOR BY COLOR, COLOR PIXEL VALUES OF THE TARGET PIXEL AND THE NEIGHBORING PIXELS INCLUDED IN THE LOCAL WINDOW — S21

GENERATE OFFSET COLOR PIXEL VALUES BY CONVERTING THE COLOR PIXEL VALUES OF THE TARGET PIXEL AND THE NEIGHBORING PIXELS BASED ON THE LOCAL COLOR AVERAGE VALUES — S31

GENERATE A COMPENSATED COLOR PIXEL VALUE OF THE TARGET PIXEL BY COMPENSATING THE COLOR PIXEL VALUE OF THE TARGET PIXEL BASED ON THE EDGE INFORMATION AND THE OFFSET COLOR PIXEL VALUES — S41

END

FIG. 22

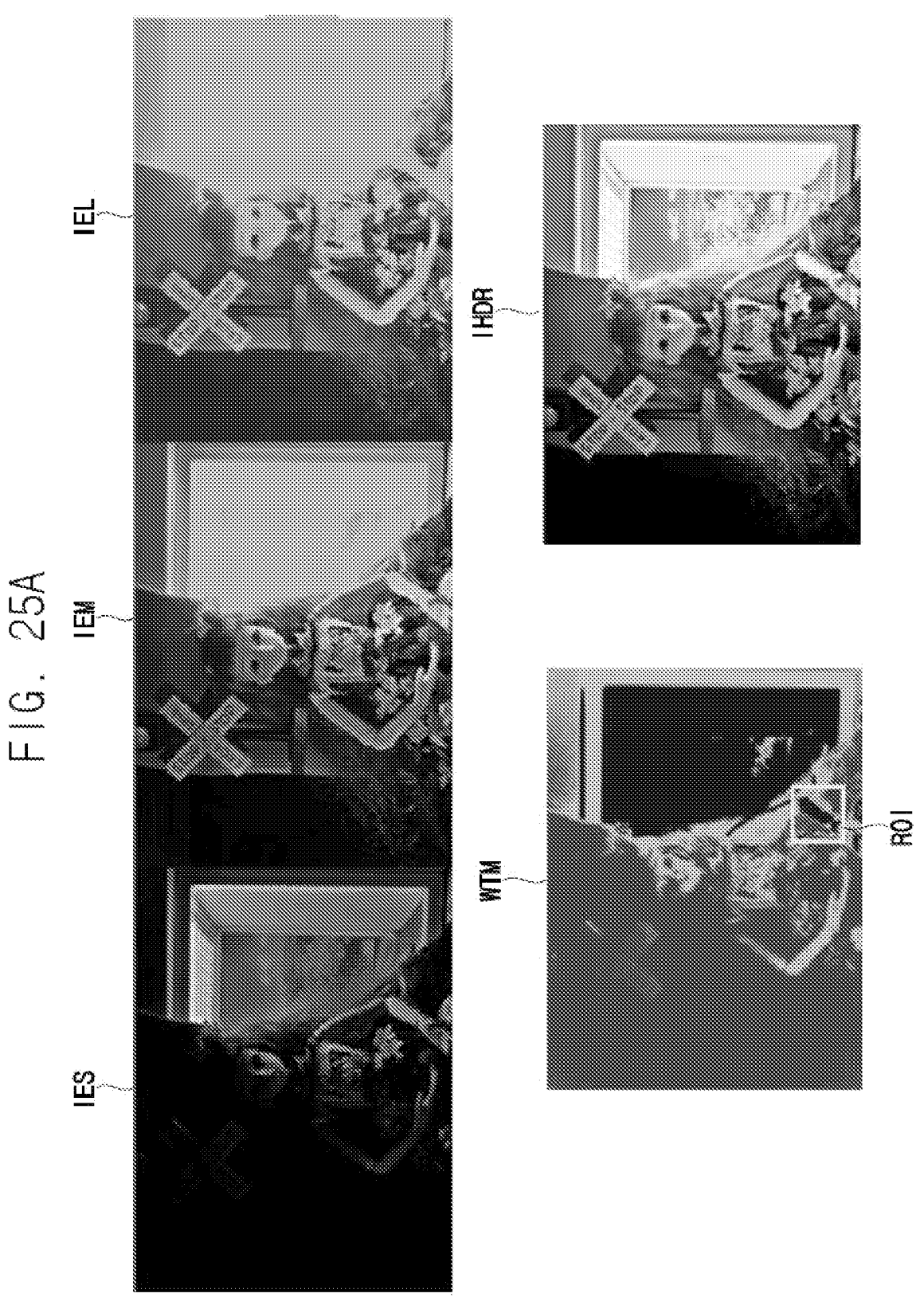
F I G. 25A

2000

IMAGE SIGNAL PROCESSOR AND METHOD OF PROCESSING IMAGES

CROSS-REFERENCE TO RELATED APPLICATION

This U.S. non-provisional application claims priority under 35 USC § 119 to Korean Patent Application No. 10-2022-0164680, filed on Nov. 30, 2022, in the Korean Intellectual Property Office (KIPO), the disclosure of which is incorporated by reference in its entirety herein.

1. Technical Field

Example embodiments relate generally to semiconductor integrated circuits, and more particularly to an image signal processor and a method of processing images to enhance quality of a high dynamic range (HDR) image.

2. Discussion of Related Art

An image processing system may include an image sensor and a processor. The image sensor converts optical signals of an object incident through an optical lens into an image of electrical signals. Examples of the image sensor include a charge-coupled device (CCD) sensor and a complementary metal oxide (CMOS) sensor. The processor performs image processing on the image.

The range of brightness that can be perceived by the image sensor is narrower than the range of brightness that can be perceived by the human eye. An image taken under a backlight situation may differ from an actual image observed by the human eye, such as a bright background and an excessively dark object. Therefore, a high dynamic range (HDR) scheme may be used to widen the dynamic range of the image by generating a plurality of images of different brightness and processing the plurality of images. The plurality of images of different brightness may be obtaining by capturing the same object at different exposure times or by amplifying the electrical signals.

SUMMARY

Some example embodiments may provide an image signal processor and a method of processing images, capable of enhancing quality of a high dynamic range (HDR) image.

According to an example embodiment, an image signal processor includes a noise reduction circuit, a high dynamic range (HDR) circuit and a post-processing circuit. The noise reduction circuit performs a noise reduction operation on a plurality of exposure noise images each having a corresponding one of a plurality of brightness levels to generate a plurality of exposure clean images in a first operation mode and performs the noise reduction operation on a single noise image corresponding to one brightness level to generate a single clean image in a second operation mode. The HDR circuit merges the plurality of exposure clean images to generate an HDR image in the first operation mode. The post-processing circuit generates an output image by processing the HDR image in the first operation mode and processing the single clean image in the second operation mode.

According to an example embodiment, an image signal processor includes a line buffer control circuit, a plurality of denoising circuits, a normalizing circuit, a weight generation circuit, a merging circuit and a post-processing circuit. The line buffer control circuit buffers and outputs a plurality of exposure noise images respectively corresponding to a plurality of brightness levels in units of data lines in a first operation mode and buffers and outputs a single noise image corresponding to one brightness level in units of data lines in a second operation mode. The plurality of denoising circuits respectively receive the plurality of exposure noise images from the line buffer control circuit and respectively generate the plurality of exposure clean images in the first operation mode, and receive the single noise image from the line buffer control circuit and generate the single clean image in the second operation mode. The normalizing circuit generates a plurality of normalized noise images by increasing a size of pixel data of the plurality of exposure noise images and generates a plurality of normalized clean images by increasing a size of pixel data of the plurality of exposure clean images in the first operation mode. The weight generation circuit generates weight values based on the plurality of normalized noise images in the second operation mode. The merging circuit generates a high dynamic range (HDR) image by merging the plurality of normalized clean images based on the weight values in the first operation mode. The post-processing circuit generates an output image by processing the HDR image in the first operation mode and processing the single clean image in the second operation mode.

According to an example embodiment, a method of processing images, includes, performing a noise reduction operation on a plurality of exposure noise images each having a corresponding one of a plurality of brightness levels to generate a plurality of exposure clean images respectively corresponding to the plurality of brightness levels in a first operation mode, performing the noise reduction operation with respect to a single noise image corresponding to one brightness level to generate a single clean image in a second operation mode, merging the plurality of exposure clean images to generate a high dynamic range HDR image in the first operation mode, generating an output image by processing the HDR image in the first operation mode, and generating the output image by processing the single clean image in the second operation mode.

The image signal processor and the image processing method according to example embodiments may reduce the signal-to-noise ratio (SNR) dip of an HDR image and increase the quality of the HDR image by reducing the noise of the plurality of exposure noise images before merging images to generate the HDR image.

In addition, the image signal processor and image processing method according to example embodiments may increase the quality of the HDR image while minimizing an increase in hardware cost through efficient control of the line buffers used when merging images. In the case of the single noise image, the noise reduction performance may be further increased by increasing the number of the buffered data lines.

BRIEF DESCRIPTION OF THE DRAWINGS

Example embodiments of the present disclosure will be more clearly understood from the following detailed description taken in conjunction with the accompanying drawings.

FIG. 1 is a block diagram illustrating an image signal processor according to an example embodiment.

FIG. 2 is a flowchart illustrating a flowchart illustrating a method of processing images according to an example embodiment.

FIGS. 3A and 3B are diagrams illustrating data processing according to operation modes.

FIGS. 7A and 7B are diagrams illustrating images in a method of processing images according to an example embodiment.

FIG. 11 is a flowchart illustrating a denoising method according to an example embodiment.

FIG. 12B is a diagram illustrating example embodiments of a unit pattern in the layout of FIG. 12A.

FIG. 21 is a flowchart illustrating a denoising method according to an example embodiment.

Figure 22:
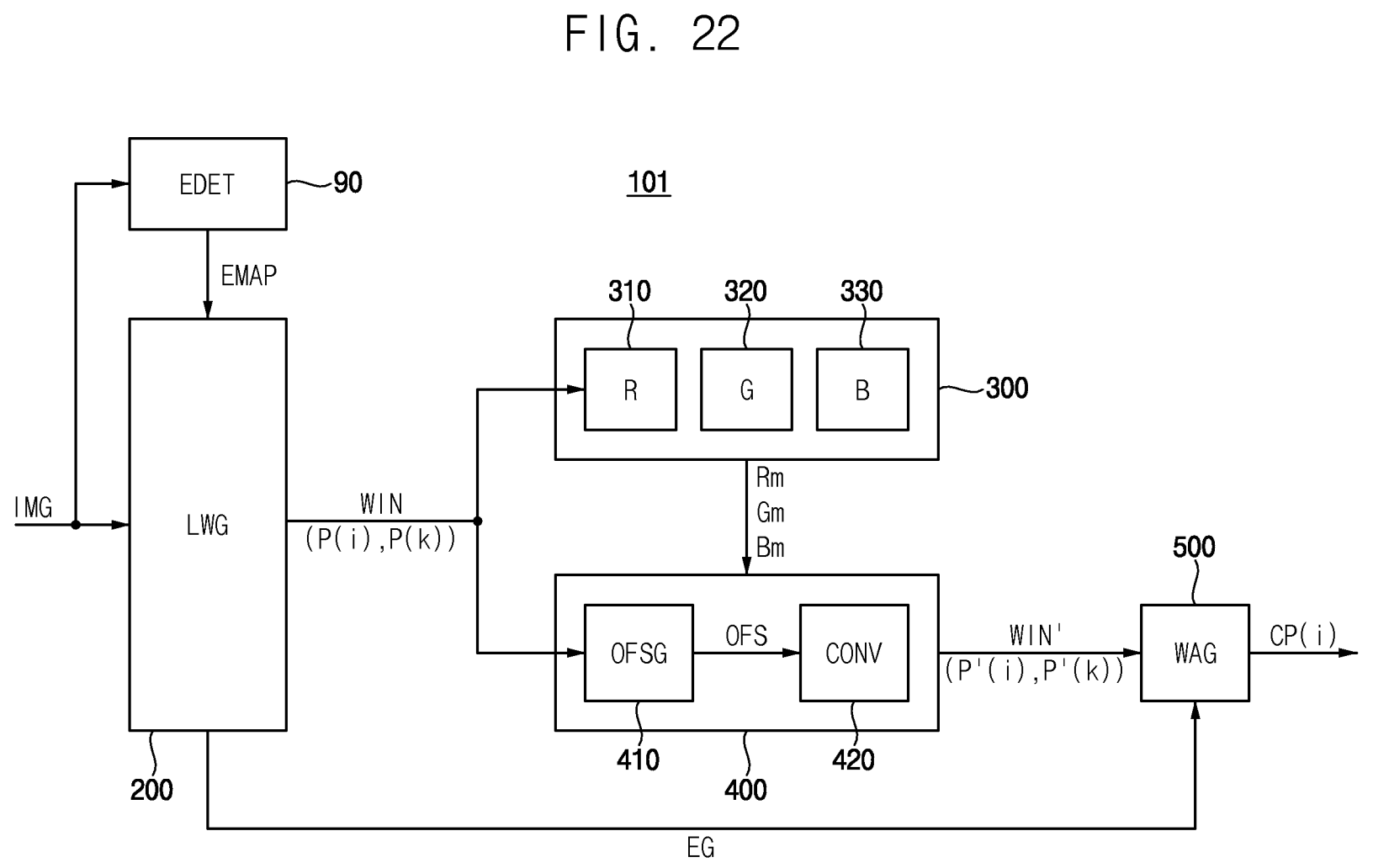

FIG. 22 is a block diagram illustrating a denoising circuit according to example an embodiment.

FIGS. 25A and 25B are diagrams illustrating enhancement of image quality by a method of processing images according to an example embodiment.

DETAILED DESCRIPTION OF THE EMBODIMENTS

Figure 4:
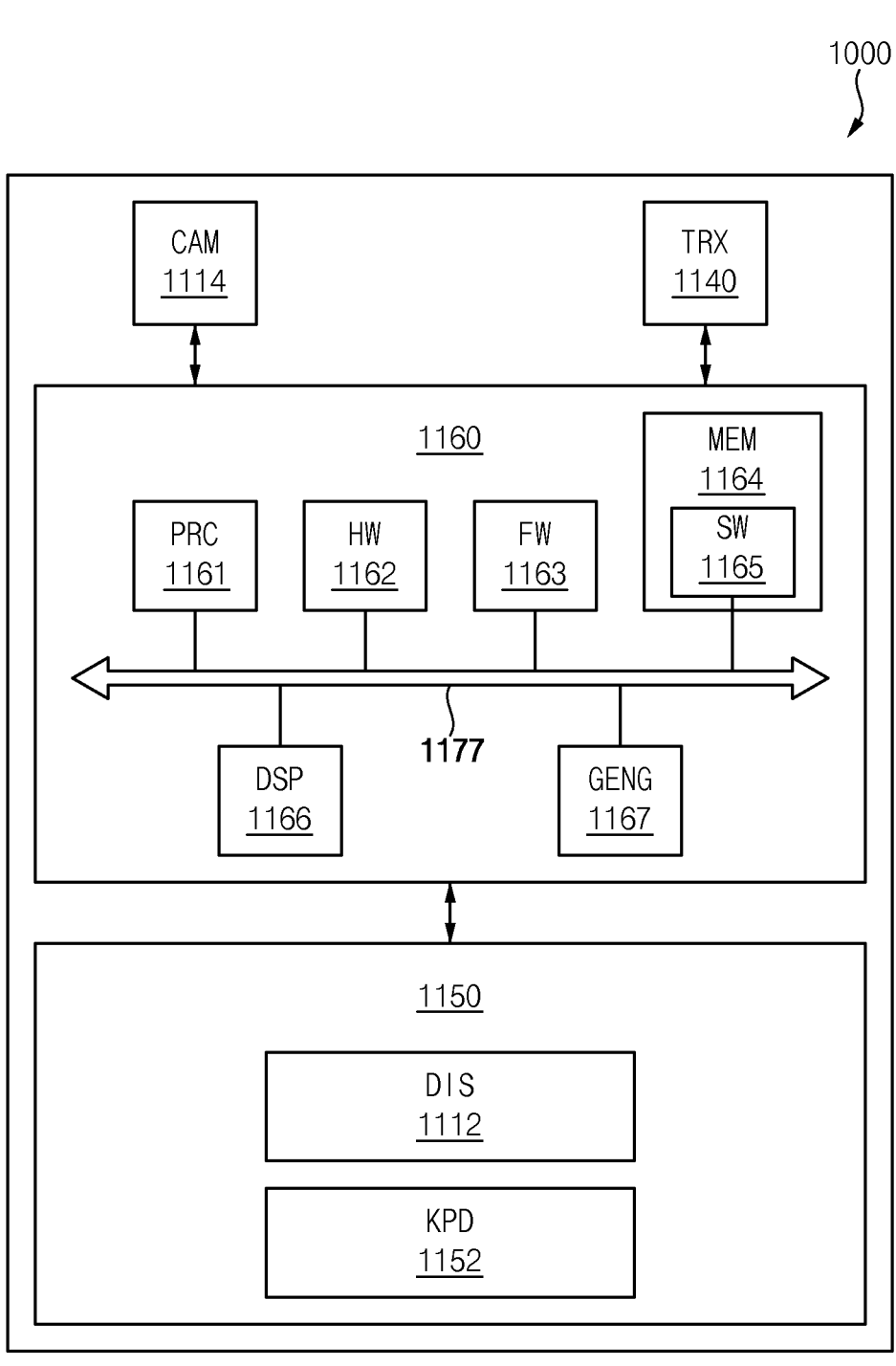
FIG. 4 is a block diagram illustrating a system performing a method of processing images according to an example embodiment.

Various example embodiments will be described more fully hereinafter with reference to the accompanying drawings, in which some example embodiments are shown. In the drawings, like numerals refer to like elements throughout. Therefore, repeated descriptions of these numerals may be omitted.

Figure 1:
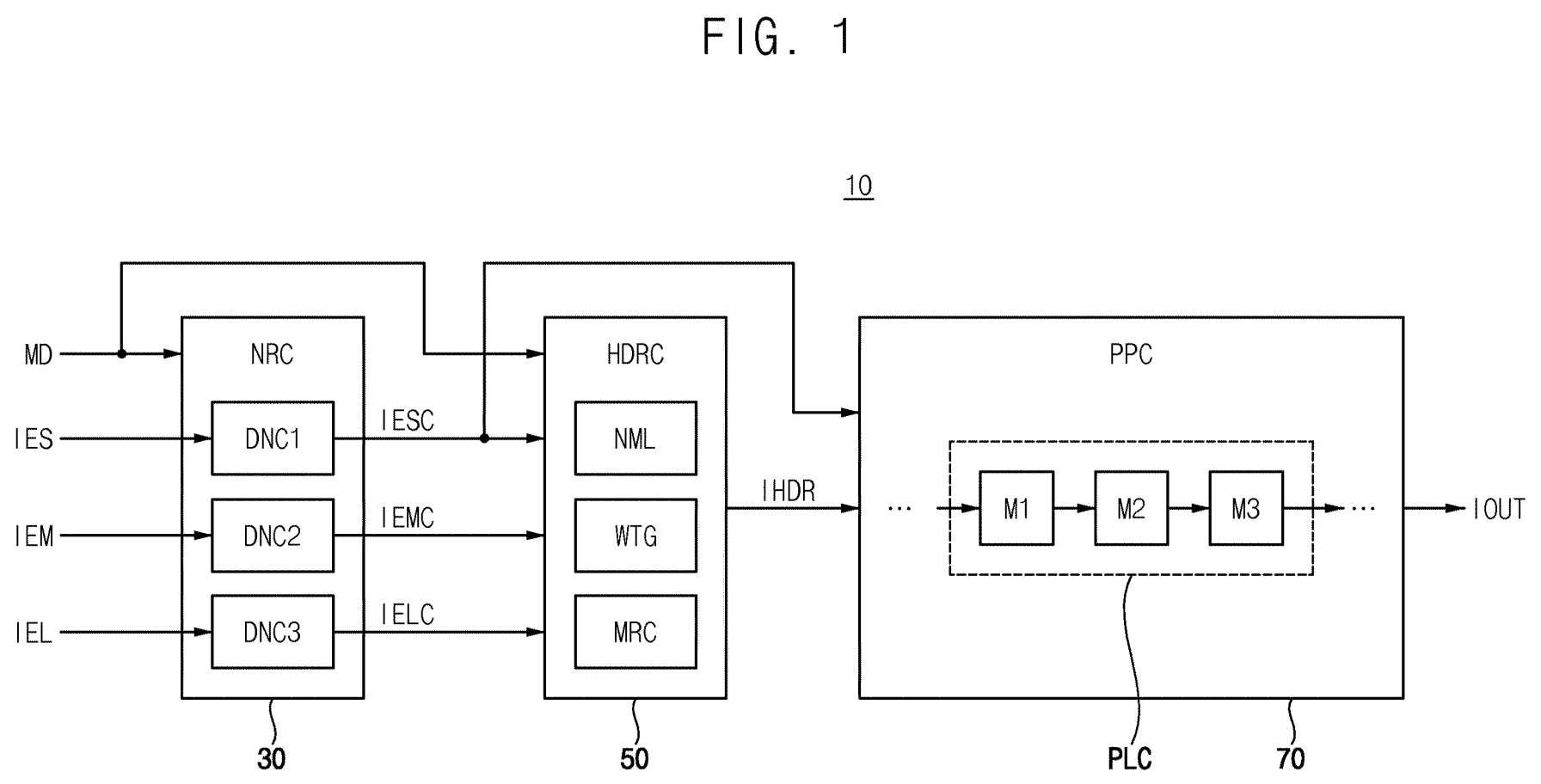

FIG. 1 is a block diagram illustrating an image signal processor according to an example embodiment, and FIG. 2 is a flowchart illustrating a flowchart illustrating a method of processing images according to an example embodiment.

Referring to FIG. 1, an image signal processor 10 may include a noise reduction circuit NRC 30, a high dynamic range (HDR) circuit HDRC 50 and a post-processing circuit PPC 70.

The image signal processor 10 may selectively operate in one of a first operation mode and a second operation mode in response to a mode signal MD. The mode signal MD may be provided from a main controller such as a central processing unit (CPU) of a system including the image signal processor 10.

The noise reduction circuit 30 may receive a plurality of exposure noise images IES, IEM and IEL respectively corresponding to a plurality of brightness levels in the first operation mode. An image sensor may capture the same object with different exposure times to generate electrical signals, the generated electrical signals may be amplified, and a plurality of exposure noise images IES, IEM and IEL having different brightness levels may be generated from amplified signals. Hereinafter, although example embodiments are described based on the different exposure times, the disclosure is not limited thereto. For example, the different brightness levels of the plurality of exposure noise images IES, IEM and IEL may be achieved using various methods.

For example, a first exposure noise image IES may correspond to a short exposure image, a second exposure noise image IEM may correspond to a medium exposure image, and a third exposure noise image IEL may correspond to a long exposure image. For example, the first exposure noise image IES may be generated using a short exposure time, a second exposure noise image IEM may be generated using a medium exposure time longer than the short exposure time, and the third exposure noise image IEL may be generated using a long exposure time longer than the medium exposure time.

The noise reduction circuit 30 may receive a single noise image corresponding to one brightness level in the second operation mode. Hereinafter, for convenience of illustration and description, example embodiments are described based on the first exposure noise image IES corresponding to the single noise image, but the disclosure is not limited thereto. The bit number (or the size) of pixel data, the exposure time, etc. of the first exposure noise image IES received in the first operation mode may be equal to those of the single noise image received in the second operation mode.

Referring to FIGS. 1 and 2, the noise reduction circuit 30 performs a noise reduction operation with respect to the plurality of exposure noise images IES, IEM and IEL respectively corresponding to the plurality of brightness levels to generate a plurality of exposure clean images IESC, IEMC and IELC respectively corresponding to the plurality of brightness levels in the first operation mode (S100). In addition, the noise reduction circuit 30 performs the noise reduction operation with respect to the single noise image IES corresponding to one brightness level to generate a single clean image IESC in the second operation mode (S200).

The HDR circuit 50 merges the plurality of exposure clean images IESC, IEMC and IELC to generate an HDR image IHDR in the first operation mode (S300). For example, the HDR circuit 50 may combine the plurality of exposure clean images IESC, IEMC and IELC to generate the HDR image IHDR.

The post-processing circuit 70 generates an output image IOUT by processing the HDR image IHDR in the first operation mode (S400). In addition, the post-processing circuit 70 generates the output image IOUT by processing the single clean image IESC in the second operation mode (S500).

FIG. 2 illustrates operations related with the first operation mode and the second operation mode together. As described above, the image signal processor 10 may selectively operate in one of the first operation mode and the second operation mode based on the mode signal MID, and the processes S100, S200, S300, S400, S500 of FIG. 2 may be not all performed sequentially as illustrated.

In an example embodiment, the noise reduction circuit 30 includes a plurality of denoising circuits DNC1, DNC2 and DNC3 configured to respectively receive the plurality of exposure noise images IES, IEM and IEL corresponding to a color filter array of an image sensor and respectively generate the plurality of exposure clean images IESC, IEMC and IELC in the first operation mode. The first denoising circuit DNC1 may perform the noise reduction operation with respect to the first exposure noise image IES to generate the first exposure clean image IESC. The second denoising circuit DNC2 may perform the noise reduction operation with respect to the second exposure noise image IEM to generate the second exposure clean image IEMC. The third denoising circuit DNC3 may perform the noise reduction operation with respect to the third exposure noise image IEL to generate the third exposure clean image IELC. Example embodiments of configurations and operations of the denoising circuit will be described below with reference to FIGS. 11 through 23.

In an example embodiment, the HDR circuit 50 includes a normalizing unit NML (e.g., a normalizing circuit), a weight generation unit WTG (e.g., a weight generation circuit) and a merging unit MRC (e.g., a merging circuit). Example embodiments of the HDR circuit 70 will be described below with reference to FIGS. 9 and 10.

The post-processing circuit 70 may include at least one pipeline circuit PLC configured to perform post-processing on the HDR image IHDR and the single clean image IESC selectively received according to the operation modes. The pipeline circuit PLC may include a plurality of processing modules M1, M2 and M3 (e.g., processors) connected in series for sequential processing of data lines of an image input to the pipeline circuit PLC. The post-processing may include brightness adjustment, sharpness adjustment, image size change, data format change, and the like.

The pipeline circuit PLC divides a process for one data line into several sub-processes, such that the plurality of processing modules M1, M2, and M3 having different functions may perform respective sub-processes. A processing result performed in each processing module may be successively transferred to the next processing module, and a final pipeline processing result may be output from the last processing module. The plurality of processing modules M1, M2 and M3 may perform each of the sub-processes for a plurality of data lines that are sequentially input to the pipeline circuit PLC. The sub-processes on the multiple data lines may be processed simultaneously by using the pipeline circuit PLC, and thus the overall processing time for data lines may be shortened through the pipelined processing.

The image signal processor 10 may further include a pre-processing circuit disposed before the noise reduction circuit 30. The pre-processing circuit may perform pre-processing on images provided from an image sensor or memory to generate the plurality of exposure noise images IES, IEM and IEL or the single noise image IES, which are provided to the noise reduction circuit 30. The pre-processing may include black level compensation, lens shading compensation, crosstalk compensation, bad pixel correction, decompressing, and the like.

Also the post-processing and/or the pre-processing may include a function for reducing noise, but the noise reduction function performed by the post-processing circuit 70 and the pre-processing circuit may be different from the noise reduction function related to the color filter array as will be described below with reference to FIGS. 11 through 23.

After generating the HDR image IHDR by merging the plurality of exposure noise images IES, IEM, and IEL, noise reduction processing may be performed on the HDR image IHDR. However, image quality of the HDR image IHDR may deteriorate due to heterogeneity caused by a signal-to-noise ratio (SNR) dip transmitted from each exposure noise image.

In contrast, the image signal processor 10 and image processing method according to an example embodiment reduces the noise of the plurality of exposure noise images IES, IEM and IEL before merging the images, thereby reducing the SNR dip of the HDR image IHDR and increasing the quality of HDR images.

Figure 3B:
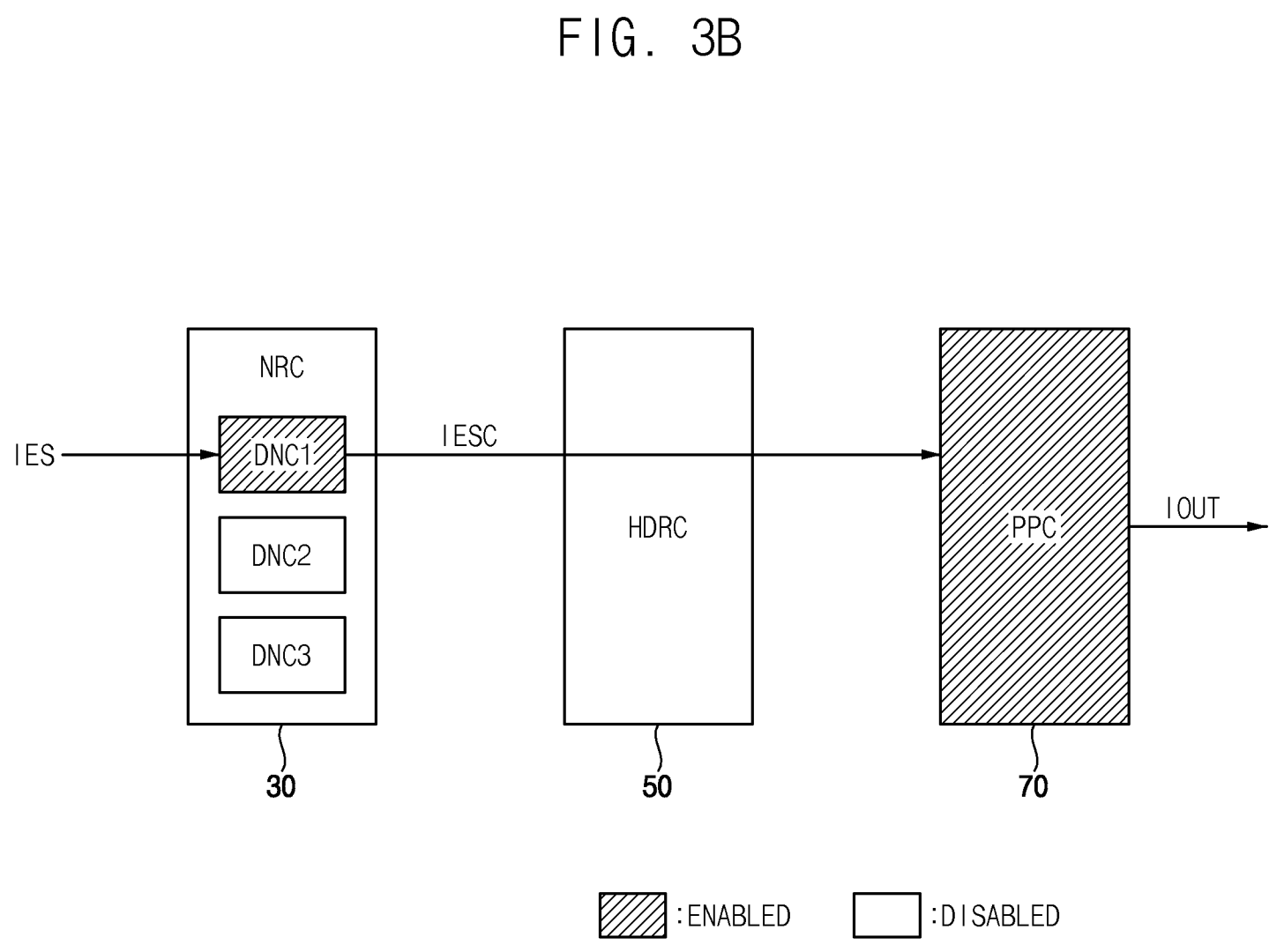

FIGS. 3A and 3B are diagrams illustrating data processing according to different operation modes. In FIGS. 3A and 3B, the hatched components are enabled and the other components (e.g., clear) are disabled.

Referring to FIGS. 3A and 3B, the noise reduction circuit 30 may include a plurality of denoising circuits DNC1, DNC2 and DNC3. FIG. 3A shows a data processing process in the first operation mode, and FIG. 3B shows a data processing process in the second operation mode.

Referring to FIG. 3A, in the first operation mode, the plurality of denoising circuits DNC1, DNC2 and DNC3, the HDR circuit 50, and the post-processing circuit 70 are all enabled.

In the first operation mode, the plurality of denoising circuits DNC1, DNC2 and DNC3 may receive the plurality of exposure noise images IES, IEM and IEL, respectively, and generate the plurality of exposure clean images IESC, IEMC and IELC, respectively. The first denoising circuit DNC1 may perform the noise reduction operation with respect to or on the first exposure noise image IES to generate the first exposure clean image IESC. The second denoising circuit DNC2 may perform the noise reduction operation with respect to or on the second exposure noise image IEM to generate the second exposure clean image IEMC. The third denoising circuit DNC3 may perform the noise reduction operation with respect to or on the third exposure noise image IEL to generate the third exposure clean image IELC.

In the first operation mode, the HDR circuit 50 may generate the HDR image IHDR by merging the plurality of exposure clean images IESC, IEMC and IELC, and the post-processing circuit 70 may generate the output image IOUT by processing the HDR image IHDR. For example, the HDR circuit 50 may combine the plurality of exposure clean images IESC, IEMC and IELC to generate the output image IOUT.

Referring to FIG. 3B, in the second operation mode, only one denoising circuit, for example, the first denoising circuit DNC1 among the plurality of denoising circuits DNC1, DNC2 and DNC3 is enabled, and the other denoising circuits DNC2 and DNC3 except the first denoising circuit DNC1 are disabled. The HDR circuit 50 may be disabled and the post-processing circuit 70 may be enabled. For example, a disabled denoising circuit does not perform a corresponding denoising operation or is powered down to prevent it from performing the denoising operation. For example, a disabled HDR circuit does not perform a merge operation. An exposure clean image may pass through the disabled HDR circuit 50 without being operated on by the HDR circuit 50.

In the second operation mode, the enabled first denoising circuit DNC1 receives the single noise image IES and reduces noise of the single noise image IES to generate the single clean image IESC. The single clean image IESC may be transferred to the post-processing circuit 70 by bypassing the disabled HDR circuit 50. For example, the HDT circuit 50 does not perform a merge operation on the single clean image IESC during the bypassing. The post-processing circuit 70 may generate the output image IOUT by processing the single clean image IESC.

FIG. 4 is a block diagram illustrating a system performing a method of processing images according to an example embodiment.

Referring to FIG. 4, a system 1000 may include camera module CAM 1114 (e.g., a camera), a transceiver TRX 1140, a control unit 1160 (e.g., a control circuit) and a user interface 1150 (e.g., a user interface circuit).

The camera module 1114 may include an HDR image sensor to generate the plurality of exposure noise images IES, IEM and IEL respectively corresponding to the plurality of brightness levels (e.g., exposure times) or having the plurality of brightness levels. In an embodiment, the brightness levels are different from one another. In some example embodiments, the HDR image sensor may be implemented to perform temporal multiplexing such that the HDR image sensor may sequentially capture the plurality of exposure noise images IES, IEM and IEL. In some example embodiments, the HDR image sensor may be implemented to perform spatial multiplexing such the pixel groups corresponding to different brightness levels are interleaved spatially to provide the plurality of exposure noise images IES, IEM and IEL.

The transceiver 1140 may provide connectivity through wired or wireless links to other networks such as an internet, a cellular network, etc.

The user interface 1150 may include input devices KPD 1152 such as a keyboard, a keypad, etc. and a display device DIS 1112 to display images. In some examples, a virtual keypad or keyboard may be integrated into the display device 1112 with a touch screen/sensor or the like.

The control unit 1160 may include a general purpose processor PRC 1161, a hardware device HW 1162, a firmware device FW 1163, a memory MEM 1164, a digital signal processor DSP 1166, a graphics engine GENG 1167, and a bus 1177. The control unit 1160 may perform the image processing method according to example embodiments. For example, the control unit 1160 may be configured to perform functions of the image processing as described above.

Example embodiments may be implemented as hardware, software, firmware, or a combination thereof.

In some example embodiments, the denoising method may be performed by the digital signal processor 1166. For example, the image signal processor 10 of FIG. 1 may include or may be included in the digital signal processor 1166 of FIG. 4. In some example embodiments, the image processing method according to example embodiments may be performed by calculation circuits included in a graphic processing unit (GPU), a neural processing unit (NPU), an image signal processor (ISP), a central processing unit (CPU), and so on.

In some example embodiments, at least a portion of the methods may be performed by program instructions that are executed by a processing device. The program instructions may be stored in the memory 1164 as software SW 1165, and the program instructions may be executed by the general purpose processor 1161 and/or the digital signal processor 1166.

In some example embodiments, to execute the program instructions, the general purpose processor 1161 may retrieve or fetch the program instructions from an internal register, an internal cache, or the memory 1164 and decode and execute the instructions. During or after execution of the program instructions, the general purpose processor 1161 may write one or more results (which may be intermediate or final results) of the program instructions to the internal register, internal cache, or the memory 1164.

The system 1000 may be a computer system taking any suitable physical form. For example, the system 1000 may be an embedded computer system, a system-on-chip (SOC), a single-board computer system (SBC) such as a computer-on-module (COM) or system-on-module (SOM), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The program instruction for implementing methods according to example embodiments may be stored in a computer-readable non-transitory storage medium or media. The computer-readable non-transitory storage medium may include one or more semiconductor-based or other integrated circuits (ICs) such as field-programmable gate arrays (FPGAs) or application-specific ICs (ASICs), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 5:
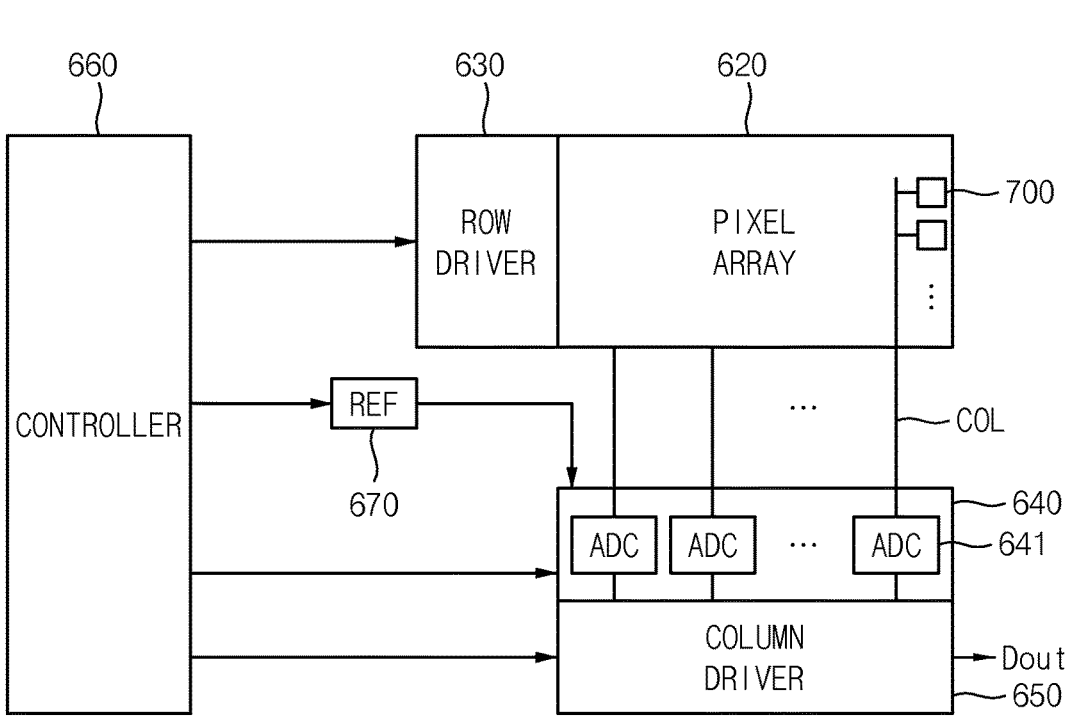
FIG. 5 is a block diagram illustrating an image sensor according to an example embodiment.

FIG. 5 is a block diagram illustrating an image sensor according to an example embodiment.

Referring to FIG. 5, an image sensor 600 may include a pixel array 620, a row driver 630 (e.g., a row driver circuit), an analog-to-digital conversion circuit 640, a column driver 650 (e.g., a column driver circuit), a controller 660 (e.g., a controller circuit), and a reference signal generator REF 670.

The pixel array 620 includes a plurality of pixels 700 coupled to column lines COL, respectively, and the plurality of pixels 700 are configure to sense incident light to generate analog signals through the column lines COL. The plurality of pixels 700 may be arranged in matrix form with a plurality of rows and a plurality of columns. The pixel array 620 may have a structure including unit patterns, which will be described below with reference to FIGS. 12A and 12B, which are arranged repeatedly in the first horizontal direction X and the second horizontal direction Y.

The row driver 630 may be coupled to the rows of the pixel array 620 to generate signals for driving the rows. For example, the row driver 630 may drive the pixels in the pixel array 620 row by row.

The analog-to-digital conversion circuit 640 may be coupled to the columns of the pixel array 620 to convert the analog signals from the pixel array 620 to digital signals. As illustrated in FIG. 3, the analog-to-digital conversion circuit 640 may include a plurality of analog-to-digital converters (ADC) 641 to perform analog-to-digital conversion of the analog signals output from the column lines COL in parallel or simultaneously.

The analog-to-digital conversion circuit 640 may include a correlated double sampling (CDS) unit. In an example embodiment of the present disclosure, the CDS unit performs an analog double sampling by extracting a valid image component based on a difference between an analog reset signal and an analog image signal. In an example embodiment of the present disclosure, the CDS unit performs a digital double sampling by converting the analog reset signal and the analog image signal to two digital signals and extracting a difference between the two digital signals as the valid image component. In an example embodiment of the present disclosure, the CDS unit performs a dual CDS by performing both the analog double sampling and digital double sampling.

The column driver 650 may output the digital signals from the analog-to-digital conversion circuit 640 sequentially as output data Dout.

The controller 660 may control the row driver 630, the analog-to-digital conversion circuit 640, the column driver 650, and the reference signal generator 670. The controller 660 may provide control signals such as clock signals, timing control signals, etc. used for the operations of the row driver 630, the analog-to-digital conversion circuit 640, the column driver 650, and the reference signal generator 670. The controller 660 may include a control logic circuit, a phase-locked loop, a timing control circuit, a communication interface circuit, etc.

The reference signal generator 670 may generate a reference signal or a ramp signal that increases or decreases gradually and provide the ramp signal to the analog-to-digital conversion circuit 640.

Figure 6:
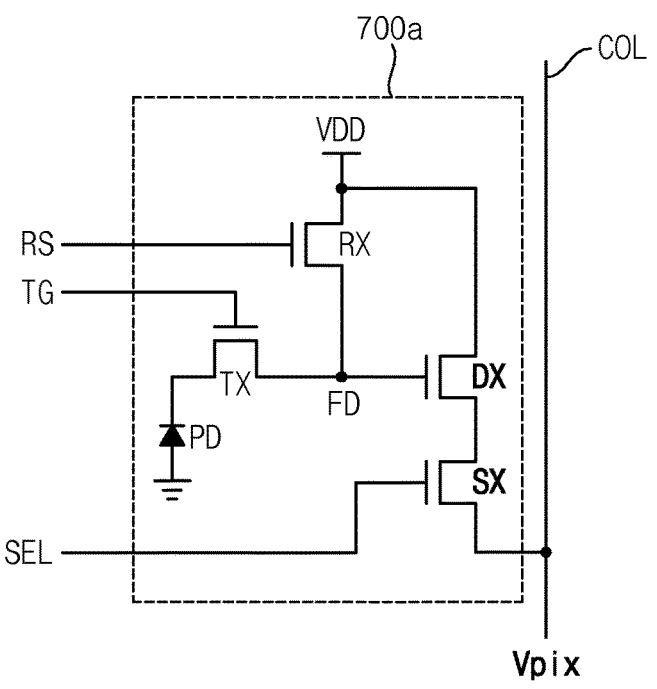
FIG. 6 is a circuit diagram illustrating an example of a unit pixel included in the image sensor of FIG. 5.

FIG. 6 is a circuit diagram illustrating an example of a unit pixel included in the image sensor of FIG. 5.

Referring to FIG. 6, a unit pixel 700a of the pixel array 620 may include a photo-sensitive element such as a photodiode PD, and a readout circuit including a transfer transistor TX, a reset transistor RX, a drive transistor DX and/or a selection transistor SX.

For example, the photodiode PD may include an n-type region in a p-type substrate such that the n-type region and the p-type substrate form a p-n conjunction diode. The photodiode PD receives the incident light and generates a photo-charge based on the incident light. In some example embodiments, the unit pixel 600a may include a phototransistor, a photogate, and/or a pinned photodiode, etc. instead of, or in addition to, the photodiode PD.

The photo-charge generated in the photodiode PD may be transferred to a floating diffusion node FD through the transfer transistor TX. The transfer transistor TX may be turned on in response to a transfer control signal TG.

The drive transistor DX functions as a source follower amplifier that amplifies a signal corresponding to the charge on the floating diffusion node FD. The selection transistor SX may transfer the pixel signal Vpix to a column line COL in response to a selection signal SEL.

The floating diffusion node FD may be reset by the reset transistor RX. For example, the reset transistor RX may discharge the floating diffusion node FD in response to a reset signal RS for correlated double sampling (CDS).

FIG. 6 illustrates the unit pixel 700a of A four-transistor configuration including the four transistors TX, RX, DX and SX. However, the configuration of the unit pixel may be variously changed and the pixel structure is not limited to that of FIG. 6.

FIGS. 7A and 7B are diagrams illustrating images in a method of processing images according to example embodiments. FIGS. 7A and 7B illustrate images corresponding to one frame or one frame period.

Referring to FIG. 7A, each of the plurality of exposure noise images IES, IEM and IEL as described above may include a plurality of data lines. The first exposure noise image IES may include a plurality of data lines SIL1~SILk, the second exposure noise image IEM may include a plurality of data lines MIL1~MILk, and the third exposure noise image IEL may include a plurality of data lines LIL1~LILk. The plurality of exposure noise images IES, IEM and IEL may all be images captured of the same scene (or the same object). In other words, the n-th data line SILn of the first exposure noise image IES (where n is a natural number between 1 and k), the n-th data line MILn of the second exposure noise image IEM, and the n-th data line LILn of the third exposure noise image IEL may represent the same portion of the scene. Data of such data lines may be provided to the line buffer control circuit LBC in units of data lines as will be described below with reference to FIGS. 8A and 8B.

Referring to FIG. 7B, each of the plurality of exposure clean images IESC, IEMC and IELC described above may include a plurality of data lines. For example, each of the exposure clean images IESC, IEMC and IELC may include a plurality of rows of image data. The first exposure clean image IESC may include a plurality of data lines SILC1~SILCk, the second exposure clean image IEMC may include a plurality of data lines MILC1~MILCk, and the third exposure clean image IELC may include a plurality of data lines LILC1~LILCk. The HDR circuit 50 may generate data lines of the HDR image IHDR line by line by merging the plurality of exposure clean images IESC, IEMC and IELC line by line. In other words, the HDR circuit 50 may generate the n-th data line HILn of the HDR image IHDR by merging the n-th data line SILCn of the first exposure clean image IESC (where n is a natural number between 1 and k), the n-th data line of the second exposure clean image IEMC, and the n-th data line LILCn of the third exposure clean image IELC.

Figure 8A:
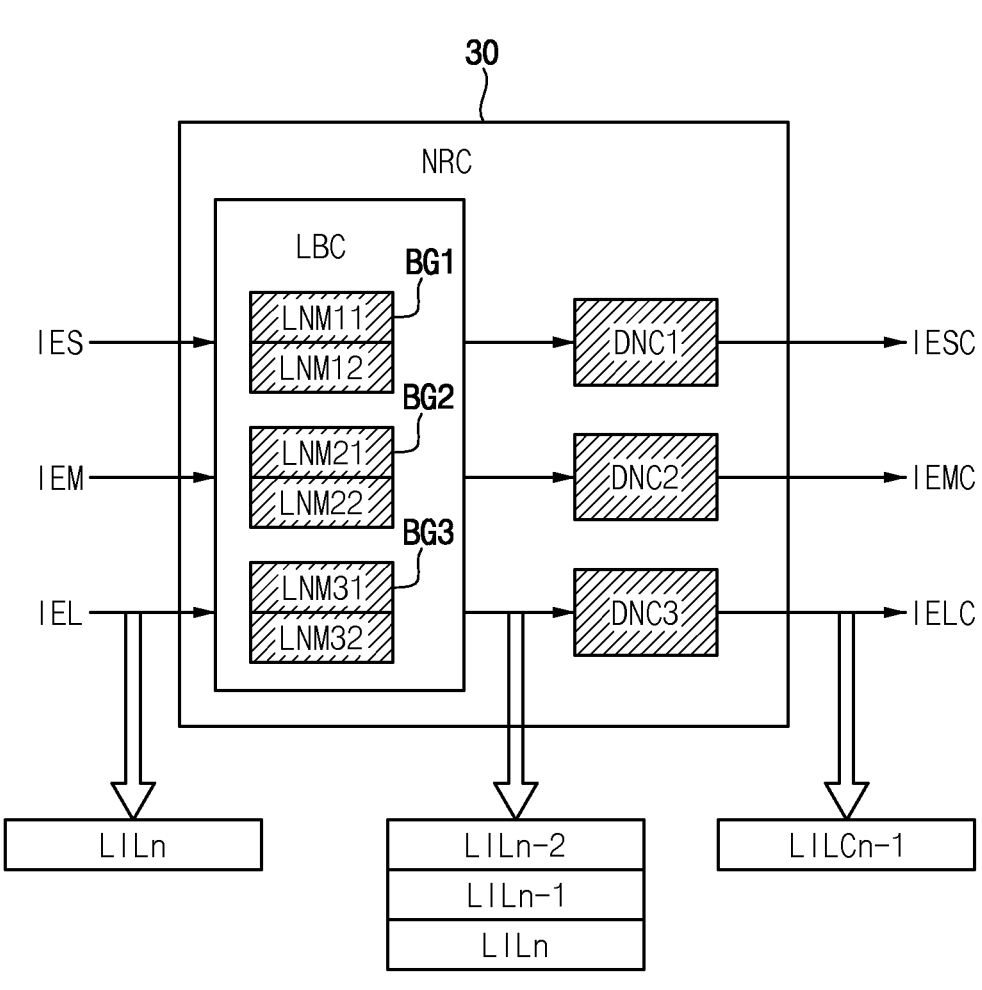
FIGS. 8A and 8B are diagram illustrating an example embodiment of a noise reduction circuit included in an image signal processor according to an example embodiment and data processing according to operation modes.
Figure 8B:
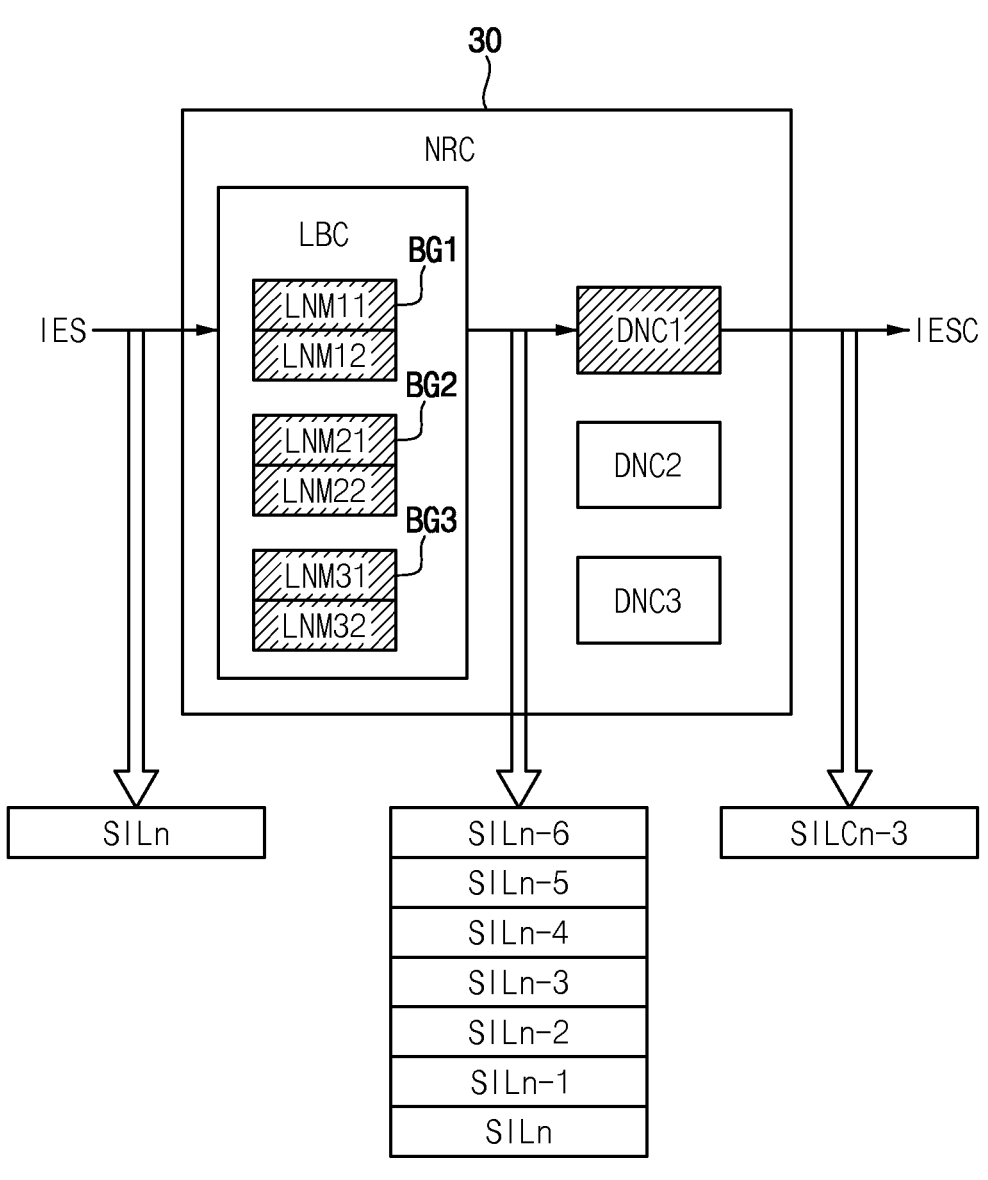

FIGS. 8A and 8B are diagrams illustrating an example embodiment of a noise reduction circuit included in an image signal processor according to example embodiments and data processing according to operation modes. In FIGS. 8A and 8B, the hatched components are enabled and the other components (e.g., clear) are disabled.

Referring to FIGS. 8A and 8B, the noise reduction circuit 30 may include a line buffer control circuit LBC and a plurality of denoising circuits DNC1, DNC2 and DNC3. The line buffer control circuit LBC may include a plurality of buffer groups BG1, BG2 and BG3. FIG. 8A shows a data processing process in the first operation mode, and FIG. 8B shows a data processing process in the second operation mode.

Referring to FIG. 8A, in the first operation mode, the plurality of buffer groups BG1, BG2 and BG3 and the plurality of denoising circuits DNC1, DNC2 and DNC3 are all enabled.

In the first operation mode, the line buffer control circuit LBC may buffer and output the plurality of exposure noise images IES, IEM and IEL line by line (i.e., in units of data lines). In the first operation mode, the plurality of buffer groups BG1, BG2 and BG3 may store the data lines of the plurality of exposure noise images IES, IEM and IEL, respectively. For example, each of the plurality of buffer groups BG1, BG2 and BG3 may include two line buffers storing two previously received data lines. The first buffer group BG1 may include two line buffers LNM11 and LNM12 storing two previously-received data lines of the first exposure noise image IES, the second buffer group BG2 may include two line buffers LNM21 and LNM22 storing two previously-received data lines of the second exposure noise image IEM, and the third buffer group BG3 may include two line buffers LNM31 and LNM32 storing two previously-received data lines of the third exposure noise image IEL. The number of line buffers included in each buffer group is not limited to two and may be variously determined according to noise reduction performance. For example, when a buffer group includes two line buffers, each of the line buffers of the buffer group may store a different half of the received image; when a buffer group includes three line buffers, each of the line buffers of the buffer group may store a different third of the received image; etc.

The line buffer control circuit LBC, in synchronization with the currently-received n-th data line of the third exposure noise image IEL, may simultaneously output the (n−2)-th data line and the (n−1)-th data line that are stored in the line buffers LNM31 and LNM32 of the third buffer group BG3 and the currently received n-th data line LILn.

The third denoising circuit DNC3, based on the three data lines LILn~LILn−2 that are received simultaneously, may perform the noise reduction operation pixel by pixel (i.e., by units of pixels) to output the (n−1)-th data line LILCn−1 of the third exposure clean image IELC as will be described below with reference to FIGS. 11 through 23.

In FIG. 8A, for convenience of illustration, only line-by-line operations for the third exposure noise image IEL are shown. It will be understood that the line-by-line operation of the first exposure noise image IES and the line-by-line operation of the second exposure noise image IEM may be performed in the same manner.

As such, the plurality of denoising circuits DNC1, DNC2 and DNC3 may process the plurality of exposure noise images IES, IEM and IEL in units of data lines, respectively, to generate the plurality of exposure clean images IESC, IEMC and IELC.

Referring to FIG. 8B, in the second operation mode, the plurality of buffer groups BG1, BG2 and BG3 and the first denoising circuit DNC1 are enabled, and the second denoising circuit DNC2 and the third denoising circuit DNC3 is disabled. Although FIG. 8B shows an embodiment in which all three buffer groups are enabled, the disclosure is not limited thereto. In some example embodiments, two buffer groups may be enabled and one buffer group may be disabled.

In the second operation mode, the line buffer control circuit LBC may buffer and output the single noise image IES line by line. In the second operation mode, the plurality of buffer groups BG1, BG2 and BG3 may be enabled, and the line buffer control circuit LBC may store the data lines of the single noise image IES in the enabled buffer groups BG1, BG2 and BG3.

The line buffer control circuit LBC, in synchronization with the currently-received n-th data line of the single noise image IES, may simultaneously output the six data lines SILn−1~SILn−6 that are stored in the line buffers LNM11, LNM12, LNM21, LNM22, LNM31 and LNM32 of the enabled buffer groups BG1, BG2 and BG3 and the currently received n-th data line SILn.

The first denoising circuit DNC1, based on the seven data lines SILn~SIN−6 that are simultaneously received, may perform the noise reduction operation pixel by pixel (i.e., by units of pixels) to output the (n−3)-th data line SILCn−3 of the single clean image IESC as will be described below with reference to FIGS. 11 through 23.

As such, the first denoising circuit DNC1 that is enabled in the second operation mode may process the single noise image IES in units of data lines to generate the single clean image IESC.

As described with reference to FIGS. 8A and 8B, the noise reduction circuit 30 may reduce noise of each of the plurality of exposure noise images IES, IEM and IEL based on the three data lines in the first operation mode, and, in the second operation mode, reduce noise of the single noise image IES based on the seven data lines. As the number of the data lines simultaneously provided to the denoising circuit increases, the size of a local window for noise reduction as will be described below with reference to FIGS. 11 through 23 may be increased and the noise reduction performance may be increased. In other words, the noise reduction circuit 30 may reduce noise of the plurality of exposure noise images IES, IEM and IEL with a first noise reduction performance in the first operation mode, and reduce noise of the single noise image with a second noise reduction performance higher than the performance in the second operation mode.

As such, through efficient control of the line buffers that are used when merging images, the noise reduction performance may be increased by increasing the number of buffered data lines in the case of the single noise image IES.

Figure 9:
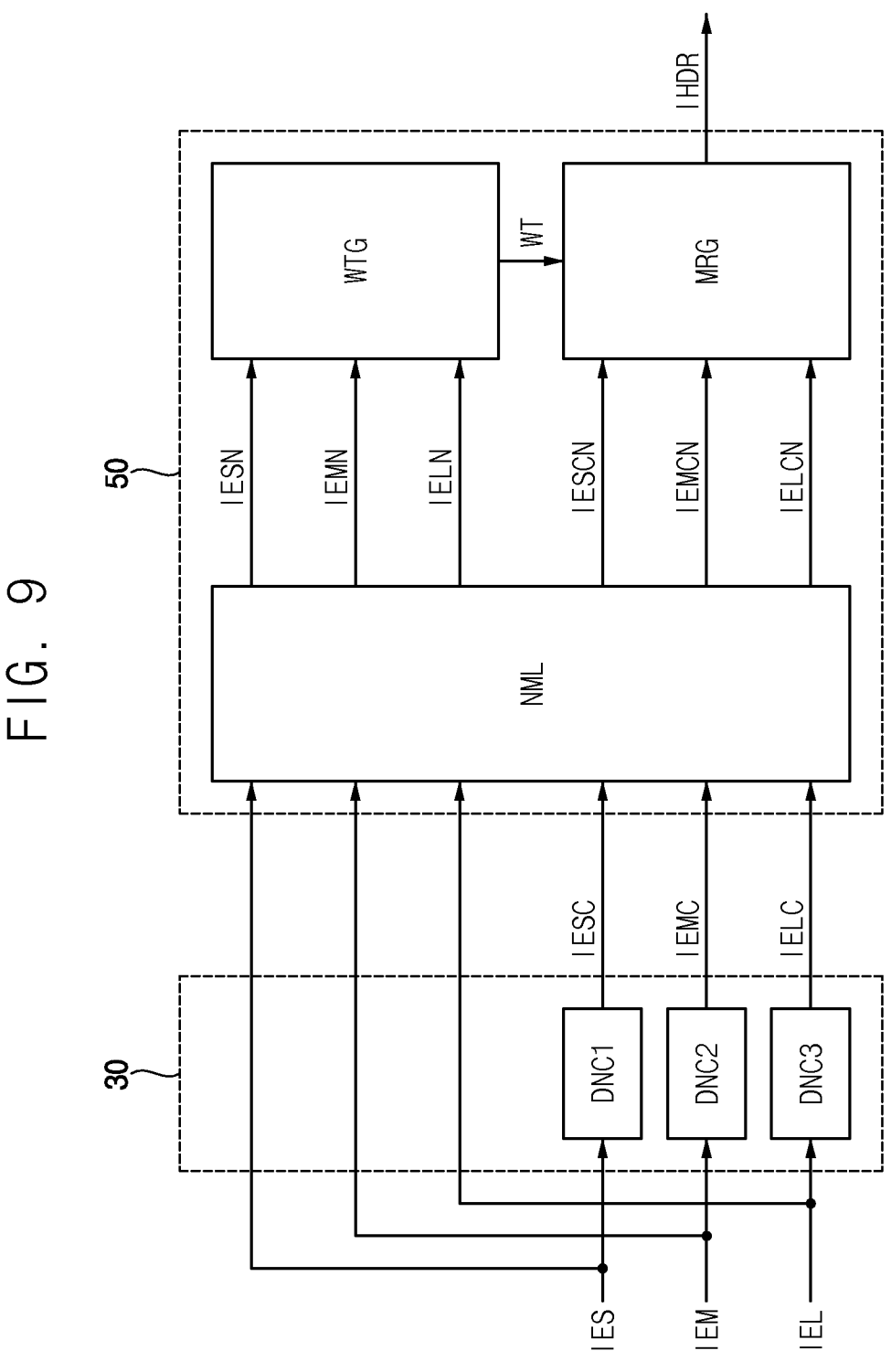
FIG. 9 is a diagram illustrating an example embodiment of a high dynamic range (HDR) circuit included in an image signal processor according to an example embodiment.

FIG. 9 is a diagram illustrating an example embodiment of a high dynamic range (HDR) circuit included in an image signal processor according to an example embodiment. For convenience of description, the plurality of denoising circuits DNC1, DNC2 and DNC3 included in the noise reduction circuit 300 are also illustrated in FIG. 9.

Referring to FIG. 9, the HDR circuit 50 may include a normalizing unit NML (e.g., a normalizing circuit), a weight generation unit WTG (e.g., a weight generation circuit) and a merging unit MRC (e.g., a merging circuit).

In the first operation mode, the normalizing unit NML may generate a plurality of normalized noise images IESN, IEMN and IELN by increasing a size of pixel data of the plurality of exposure noise images IES, IEM and IEL. In addition, in the second operation mode, the normalizing unit NML may generate a plurality of normalized clean images IESCN, IEMCN and IELCN by increasing a size of pixel data of the plurality of exposure clean images IESC, IEMC and IELC. In an embodiment, increasing the size of the pixel data increases its physical size or dimensions but does not change its resolution.

The weight generation unit WGT may generate weight values WT based on the plurality of normalized noise images IESN, IEMN and IELN in the first operation mode. The merging unit MGC may generate the HDR image IHDR by merging the plurality of normalized clean images IESCN, IEMCN and IELCN based on the weight values WT. For example, the merging unit MGC could multiply a first weight value of the weight values WT associated with the normalized noise image IESN by the normalized clean image IESCN to generate a first weighted image, multiply a second weight value of the weight values WT associated with the normalized noise image IEMN by the normalized noise image IEMCN to generate a second weighted image, and multiply a third weight value of the weight values WT associated with the normalized noise image IELN by the normalized noise image IELCN to generate a third weighted image, and generate the HDR image IHDR by merging or combining the first through third weighted images.

The configurations of the normalizing unit NML, the weight generation unit WTG and the merging unit MRC are not specified and may be variously implemented with configurations.

Figure 10:
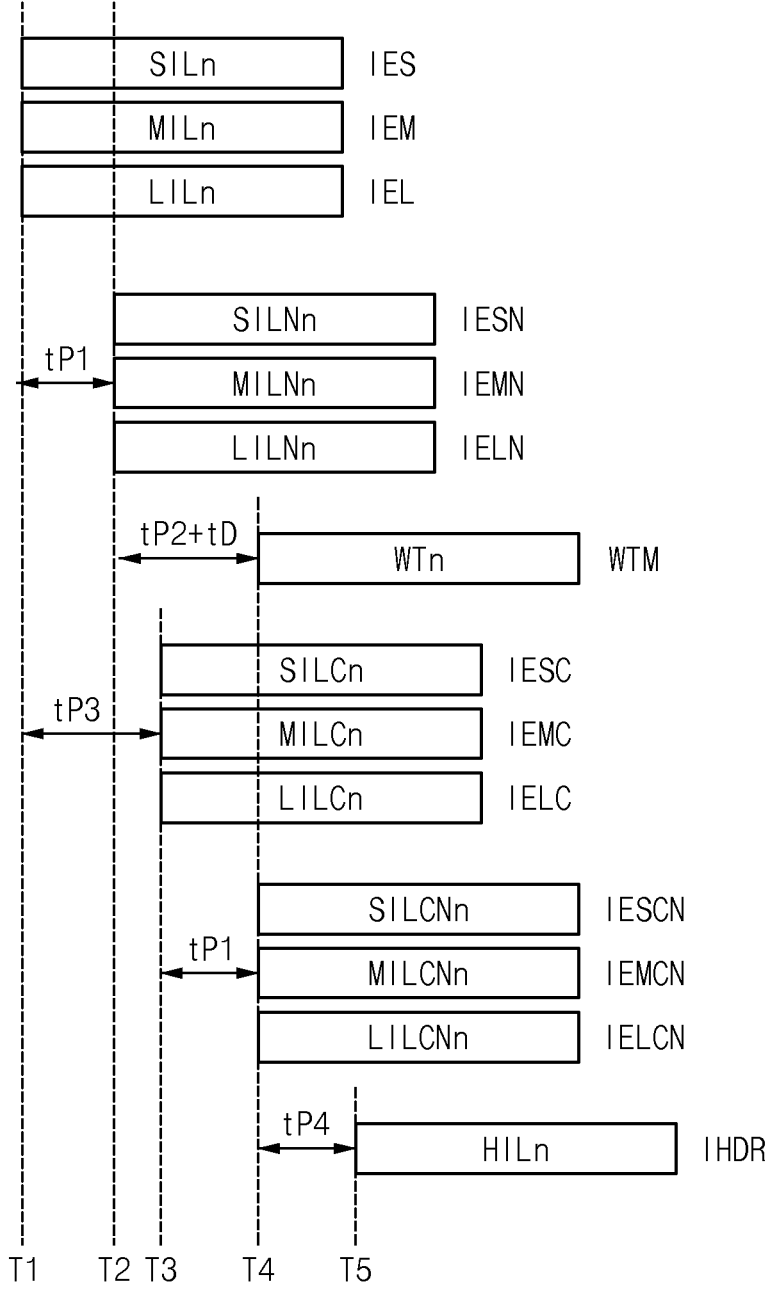
FIG. 10 is a diagram illustrating operation timings of the HDR circuit of FIG. 9.

FIG. 10 is a diagram illustrating operation timings of the HDR circuit of FIG. 9.

FIG. 10 illustrates the n-th data lines SILn, MILn and LILn of the plurality of exposure noise images IES, IEM and IEL, the n-th data lines SILNn, MILNn and LILn of the plurality of normalized noise images IESN, IEMN and IELN, the n-th line WTn of a weight map WTM, the n-th data lines SILCn, MILCn and LILCn of the plurality of exposure clean images IESC, IEMC and IELC, the n-th data lines SILCNn, MILCNn and LILCNn of the plurality of normalized clean images IESCN, IEMCN and IELCN and the n-th data line HILn of the HDR image IHDR.

Referring to FIGS. 9 and 10, at a first time point T1, the plurality of denoising circuits DNC1, DNC2 and DNC3 and the normalization unit NML of the HDR circuit 50 may receive the n-th data lines SILn, MILn and LILn of the plurality of exposure noise images IES, IEM and IEL.

The normalizer NML (e.g., normalizer circuit) may process the n-th data lines SILn, MILn and LILn of the plurality of exposure noise images IES, IEM, and IEL during a first processing time tP1, and output the n-th data lines SILNn, MILNn and LILNn of the plurality of normalized noise images IESN, IEMN and IELN at a second time point T2.

Meanwhile, the plurality of denoising circuits DNC1, DNC2 and DNC3 may process the n-th data lines SILn, MILn and LILn of the plurality of exposure noise images IES, IEM and IEL during a third processing time tP3 and output the n-th data lines SILCn, MILCn and LILCn of the plurality of exposure clean images IESC, IEMC and IELC at a third time point T3.

The normalizer NML may process the n-th data lines SILCn, MILCn and LILCn of the plurality of exposure clean images IESC, IEMC, and IELC during the first processing time tP1, and output the n-th data lines SILCNn, MILCNn and LILCNn of the plurality of normalized clean images IESCN, IEMCN and IELCN at a fourth time point T4.

As a result, the normalizer NML may receive the n-th data lines SILn, MILn and LILn of the plurality of exposure noise images IES, IEM and IEL before receiving the n-th data lines SILCn, MILCn and LILCn of the plurality of exposure clean images IESC, IEMC and IELC and output the n-th data lines SILNn, MILNn and LILNn of the plurality of normalized noise images IESN, IEMN and IELN before outputting the n-th data lines SILCNn, MILCNn and LILCNn of the plurality of normalized clean images IESCN, IEMCN and IELCN.

The weight generation unit WTG (e.g., weight generation circuit) may process the nth data lines SILNn, MILNn and LILNn of the plurality of normalized noise images IESN, IEMN and IELN during a second processing time tP2 to generate the n-th line WTn of the weight map WTM. In an embodiment, the weight generation unit WTG includes a delay circuit having a delay time tD on an internal path to output the n-th line WTn of the weight map WTM at the fourth time point T4.

As a result, the merging unit MRC may receive the n-th data lines SILCNn, MILCNn and LILCNn of the plurality of normalized clean images IESCN, IEMCN and IELCN from the normalizing unit NML at the fourth time point T4. At the same time, the merging unit MRC may receive the weight values corresponding to the n-th data lines SILNn, MILNn and LILNn of the plurality of normalized noise images IESN, IEMN, and IELN, that is, the n-th line WTn of the weight map WTM from the weight generation unit WTG at the fourth time point T4.

The merging unit MRC may process the n-th data lines SILCNn, MILCNn and LILCNn of the plurality of normalized clean images IESCN, IEMCN and IELCN based on the n-th line WTn of the weight map WTM during a fourth processing time tP4 and output the n-th data line HILn of the HDR image IHDR at a fifth time point T5.

As such, in the first operating mode, the HDR circuit 50 may perform processing without buffering the data lines because the HDR circuit 50 may simultaneously receive the data lines and weight values used for processing. In other words, in the first operation mode, the HDR circuit 50 does not buffer the n-th data lines SILCn, MILCn and LILCn of the plurality of exposure clean images IESC, IEMC and IELC such that the HDR circuit 50 generates the n-th data line HILn of the HDR image IHDR on the fly (or in realtime) by merging the n-th data lines SILCn, MILCn and LILCn of the plurality of exposure clean images IESC, IEMC and IELC.

As described with reference to FIGS. 8A through 10, the image signal processor 10 and the image processing method according to example embodiments may minimize an increase in hardware cost and increase the quality of the HDR image IHDR through efficient control of the line buffers that are used when merging images. As described above, in the case of the single noise image, the noise reduction performance may be further increased by increasing the number of buffered data lines.

FIG. 11 is a flowchart illustrating a denoising method according to an example embodiment.

Referring to FIG. 11, a local window including a target pixel and neighboring pixels adjacent to the target pixel are set among color pixels included in an input image (S10). The input image may correspond to a color filter array of an image sensor that generates the input image. The size of the local window may be determined depending on kind and characteristics of the input image, a required noise reduction performance, and so on. For example, the local window may have a size of m*n such that the local window includes m*n color pixels or m*n color pixel values that are arranged in a matrix form of m rows and n columns. A color pixel centered in the local window corresponds to the target pixel and the other color pixels in the local window correspond to the neighboring pixels.

Hereinafter, compensation of one target pixel in one local window is described, and it will be understood that all color pixels in the input image may be compensated sequentially by selecting each color pixel as the target pixel by moving the local window having a fixed size in a row direction and a column direction.

Local color average values are generated by averaging, color by color, color pixel values of the target pixel and the neighboring pixels included in the local window (S20). The input image may be represented by colors corresponding to the colors of the color filter array, and the local color average value may be obtained per color, for example, color by color. For example, when the color filter array has a Bayer pattern including red pixel values, green pixel values and blue pixel values, the local color average values may include a local red average value, a local green average value and a local blue average value. For example, the local red average value may be generated by averaging the red pixel values, the local green average value may be generated by averaging the green pixel values, and the local blue average value may be generated by averaging the blue pixel values.

Offset color pixel values are generated by converting the color pixel values of the target pixel and the neighboring pixels based on the local color average values (S30). In some example embodiments, color offset values may be generated by subtracting each of the local color average values from a target color average value that is the local color average value corresponding to a color of the target pixel, and each of the offset color pixel values may be generated by adding each of the color pixel values of the target pixel and the neighboring pixels to each of the color offset values. In this case, an average value of the offset color pixel values corresponding to each color is equal to a target color average value that is the local color average value corresponding to a color of the target pixel.

A compensated color pixel value of the target pixel is generated by compensating or adjusting the color pixel value of the target pixel based on the offset color pixel values (S40). In some example embodiments, a weighted average value may be generated by applying weight values to the offset color pixel values with respect to all of the target pixel and the neighboring pixels in the local window and the weighted average value may be provided as the compensated color pixel value of the target pixel.

As such, the denoising method and the denoising circuit according to example embodiments may enhance noise reduction performance by adjusting the color pixel value of the target pixel in accordance with the color pixel values corresponding to all colors included in the local window regardless of the color of the target pixel. In addition, the denoising method and the denoising circuit according to example embodiments may enhance the noise reduction performance without color distortion by generating the offset color pixel values based on the local color average values and adjusting the color pixel values of the target pixel based on the offset color pixel values.

Figure 12A:
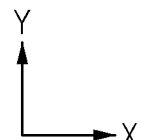
FIG. 12A is a diagram illustrating a layout of a pixel array included in the image sensor of FIG. 5.

FIG. 12A is a diagram illustrating a layout of a pixel array included in the image sensor of FIG. 5.

Referring to FIG. 12A, the pixel array 620 in the image sensor 600 of FIG. 5 may be divided into unit patterns UPTT that are arranged repeatedly in the row direction X and the column direction Y. In an example embodiment, all of the unit patterns UPTT in the pixel array 620 are identical. In this case, the unit pattern UPTT is a minimum pattern that cannot be divided into smaller patterns. In some example embodiments, the unit patterns UPTT in the pixel array 620 may include two or more different patterns such that the different patterns are arranged regularly in the first horizontal direction DR1 and/or the second horizontal direction DR2.

Hereinafter, various color filter array and unit patterns according to example embodiments are described with reference to FIG. 12B. The unit pattern may be inverted in the row direction X and/or the column direction Y, or the unit pattern may be rotated around the vertical direction by 90 degrees or 180 degrees.

FIG. 12B is a diagram illustrating example embodiments of a unit pattern in the layout of FIG. 12A.

FIG. 12B illustrates, as non-limiting examples, unit patterns of a Bayer pattern PTT1, a Tetra pattern PTT2, a Nona pattern PTT3 and an RGBW pattern PTT4. The pixel array may include a plurality of unit patterns, in other words, a plurality of color pixels arranged regularly. However, the disclosure is not limited to the unit patterns illustrated in FIG. 7 and example embodiments may be applied to any color filter array of various patterns.

Referring to FIG. 12B, the unit pattern of a Bayer pattern PTT1 may comprise a 2×2 unit that includes one red pixel R, two green pixels G and one blue pixel B. The unit pattern of a Tetra pattern PTT2 may comprise a 4×4 unit that includes four red pixels R, eight green pixels G and four blue pixels B. The unit pattern of a Nona pattern PTT3 may comprise a 6×6 unit that includes nine red pixels R, eighteen green pixels G and nine blue pixels B. The unit pattern of a RGBW pattern PTT4 may comprise a 4×4 unit that includes eight white pixels W, two red pixels R, four green pixels G and two blue pixels B.

Hereinafter, example embodiments are described based on the Bayer pattern, but the disclosure is not limited thereto. Example embodiments may be applied to any other patterns including the Tetra pattern PTT2, the Nona pattern PTT3, the RGBW pattern PTT4, and so on.

Figure 13:
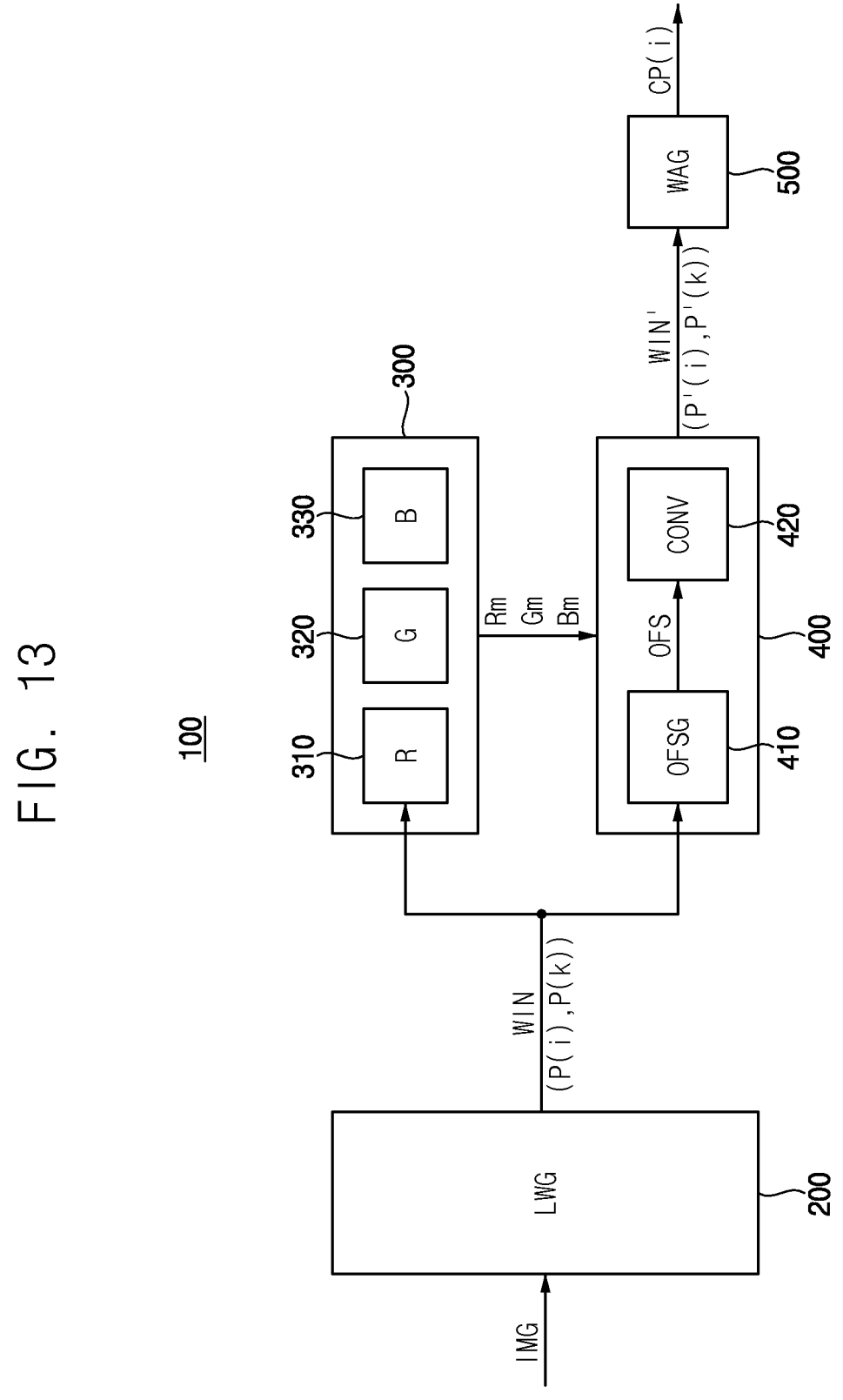
FIG. 13 is a block diagram illustrating a denoising circuit included in an image signal processor according to an example embodiment.

FIG. 13 is a block diagram illustrating a denoising circuit included in an image signal processor according to an example embodiment.

Referring to FIG. 13, a denoising circuit 100 may include a local window generator LWG 200 (e.g., a local window generator circuit), an average value generator 300 (e.g., a average value generator circuit), a convertor 400 (e.g., a convertor circuit) and a compensator WAG 500 (e.g., a compensator circuit).

The local window generator 200 may set a local window WIN including a target pixel P(i) and neighboring pixels P(k) adjacent to the target pixel P(i) among color pixels included in an input image IMG, and provide color pixel values of the target pixel P(i) and the neighboring pixels P(k). Hereinafter, P(i) may represent the target pixel or the color pixel value of the target pixel. In addition, P(k) may represent the neighboring pixels and the color pixel values of the neighboring pixels. When k=i, P(k) may indicate the target pixel P(i). The setting of the local window WIN will be further described below with reference to FIG. 15.

The average value generator 300 may generate local color average values by averaging, color by color, the color pixel values of the target pixel P(i) and the neighboring pixels P(k) included in the local window WIN. The average value generator 300 may include a plurality of color average value generators 310, 320 and 330 (e.g., color average value generator circuits) generating the local color average values, respectively.

In an example embodiment, when the input image IMG has the Bayer pattern including red pixel values, green pixel values and blue pixel values, the average value generator 300 may include a red average value generator 310, a green average value generator 320 and a blue average value generator 330. The red average value generator 310 may generate a local red average value Rm by averaging the red pixel values in the local window WIN. The green average value generator 320 may generate a local green average value Gm by averaging the green pixel values in the local window WIN. The blue average value generator 330 may generate a local blue average value Bm by averaging the blue pixel values in the local window WIN.

In case of the Bayer pattern, the local color average values may be represented by Expression 1.

$$Rm = \frac{1}{Nr} \sum_{i \in WIN} R(i)$$ 
$$Gm = \frac{1}{Ng} \sum_{i \in WIN} G(i)$$ 
$$Bm = \frac{1}{Nb} \sum_{i \in WIN} B(i)$$

Expression 1

In Expression 1, $$\sum_{i \in WIN}$$

indicates a sum with respect to the color pixels in the local window WIN, Rm indicates the local red average value, Gm indicates the local green average value, Bm indicates the local blue average value, Nr indicates the number of red pixels R(i) in the local window WIN, Ng indicates the number of green pixels G(i) in the local window WIN, and Nb indicates the number of blue pixels R(i) in the local window WIN.

The converter 400 may generate offset color pixel values P'(i) and P'(k) by converting the color pixel values of the target pixel P(i) and the neighboring pixels P(k) based on the local color average values Rm, Gm and Bm. In an example embodiment, the converter 400 includes an offset generator OFSG 410 (e.g., a offset generator circuit) and a pixel value converting unit CONV 420 (e.g., a pixel value converting circuit).

The offset generator 410 may generate each of the color offset values OFS by subtracting each of the local color average values Rm, Gm and Bm from a target color average value that is the local color average value corresponding to a color of the target pixel P(i). The pixel value converting unit 420 may generate each of the offset color pixel values P'(i) and P'(k) by adding each of the color pixel values of the target pixel P(i) and the neighboring pixels P(k) to each of the color offset values OFS, respectively. Each color offset value may be represented by Expression 2.

$$OFSc1c2 = C1m - C2m$$

Expression 2

In Expression 2, OFSc1c2 indicates the color offset value corresponding to a second color C2 when the target pixel P(i) corresponds to a first color C1. C1m indicates the local color average value corresponding to the first color and C2m indicates the local color average value corresponding to the second color. For example, OFSrg indicates the local color average value corresponding to the green pixel values when the target pixel P(i) is the red pixel.

The compensator 500 may generate a compensated color pixel value CP(i) of the target pixel P(i) by compensating the color pixel value of the target pixel P(i) based on the offset color pixel values P'(i) and P'(k).

In an example embodiment, with respect to all color pixels in the local window WIN' including the target pixel P(i) and the neighboring pixels P(k), the compensator 500 may generate a weighted average value by applying weight values to the offset color pixel values, and provide the weighted average value as the compensated color pixel value CP(i) value of the target pixel P(i). In this case, the compensated color pixel value CP(i) of the target pixel P(i) may be represented by Expression 3.

$$CP(i) = \frac{\sum_{k} \omega_i(k) \cdot P'(k)}{\sum_{k} \omega_i(k)}$$

Expression 3

In Expression 3, $\Sigma_k$ indicates a sum with respect to all of the color pixel values, for example, the target pixel P(i) and the neighboring pixels P(k) in the local window WIN', P'(k) indicates each offset color pixel value, and $\omega_i(k)$ indicates each weight value corresponding to each offset color pixel value P'(k).

In an example embodiment, each weight value $\omega_i(k)$ may be represented by Expression 4.

$$\omega_i(k) = e^{-\frac{|P(i)-P'(k)|}{h}}$$

Expression 4

In Expression 4, where P(i) indicates the color pixel value of the target pixel, P'(k) indicates each offset color pixel value, h indicates a noise reduction strength, and $\omega i(k)$ indicates each weight value corresponding to each offset color pixel value P'(k). The noise reduction strength h may be determined depending on kind and characteristics of the input image, a required noise reduction performance, and so on.

Figure 14:
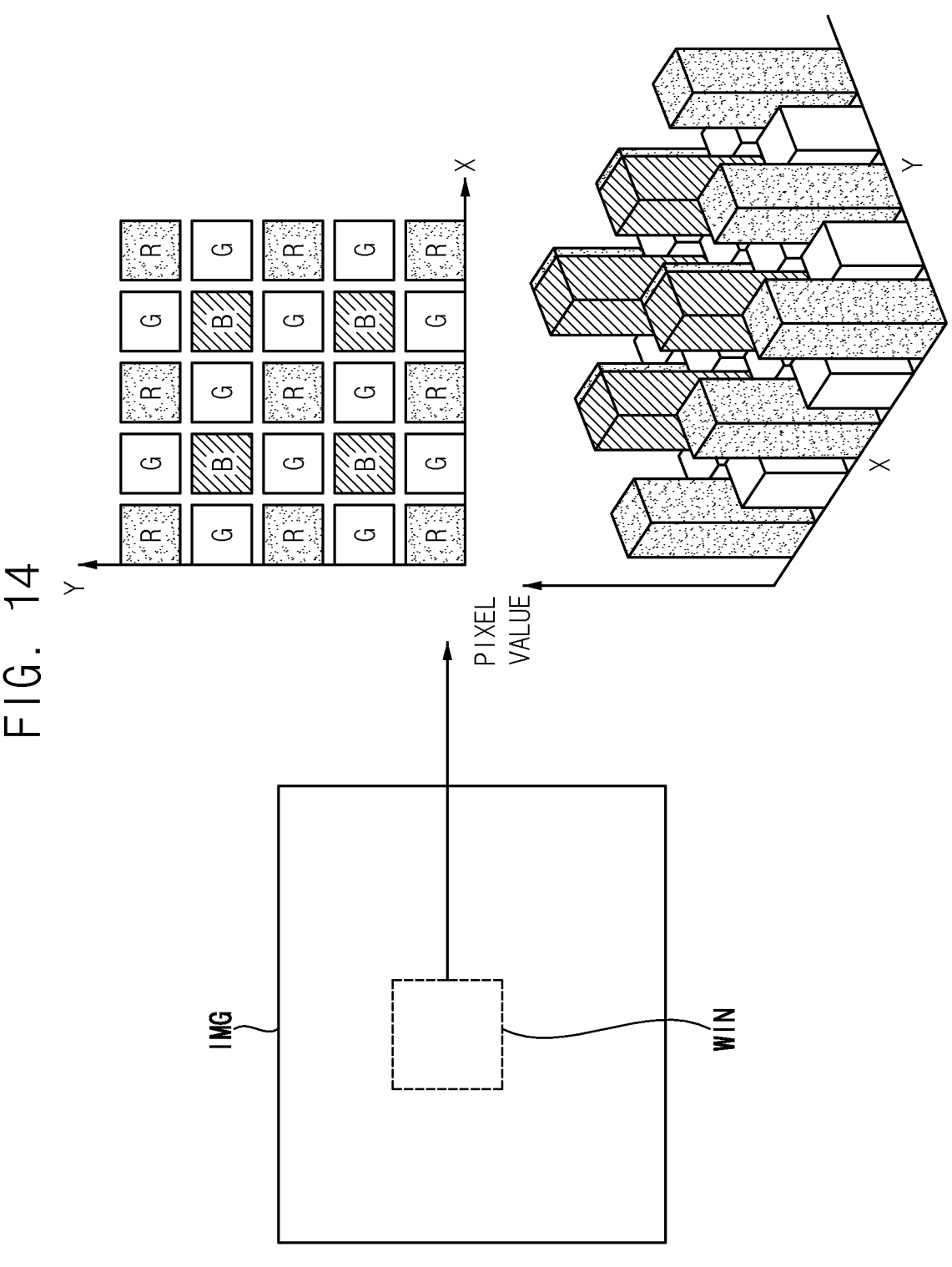
FIG. 14 is a diagram for describing a local window used in a denoising method according to an example embodiment.

FIG. 14 is a diagram for describing a local window used in a denoising method according to an example embodiment.

As an example, FIG. 14 illustrates a local window WIN and an input image IMG generated from a monochromatic test board of a purple color using an image sensor including a color filter array of the Bayer pattern.

The red pixel values R, the green pixel values G and the blue pixel values are determined by the light reflected by an object, e.g., the monochromatic test board. The color pixel centered in the local window WIN corresponds to the target pixel to which the denoising method is applied. In case of FIG. 14, the red pixel corresponds to the target pixel.

It may be assumed that the color pixel values of the input image IMG have distributions of averages and variations per color as will be described below with reference to FIGS. 15 through 20. Here, the variations in the color pixel values per color may be determined by noises in case of the monochromatic object.

When the pixels of the different colors are used in denoising, the final output image may result in color distortion if the average color pixel value is changed after denoising. According to an example embodiment, a local channel compensation is applied using the local window such that the average color pixel value in the compensated image is not changed even though the pixel values corresponding to different colors from the target pixel are used in denoising. Such local channel compensation will be further described with reference to FIGS. 15 through 20.

Figure 15:
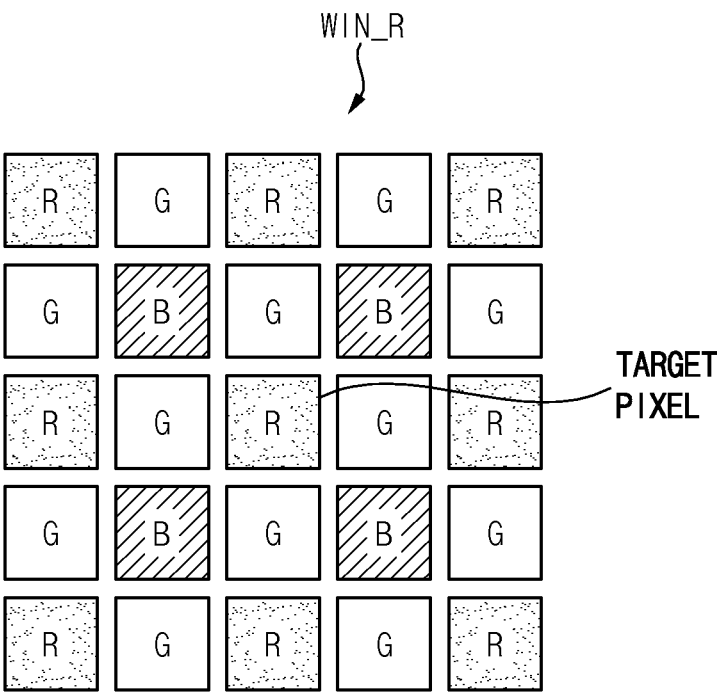
FIG. 15 is a diagram illustrating an example embodiment of a local window when a target pixel corresponds to a red pixel in a Bayer pattern.
Figure 16:
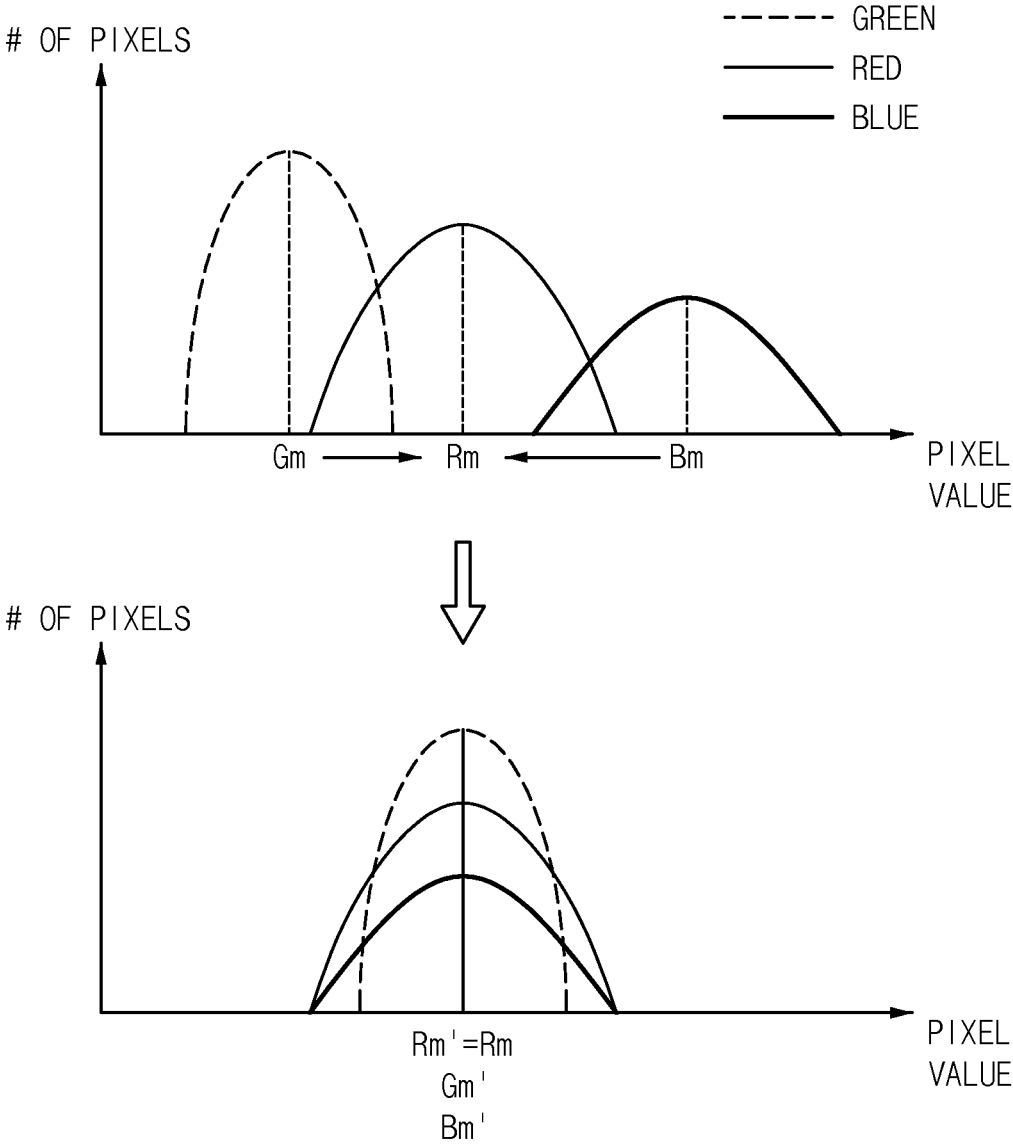
FIG. 16 is a diagram illustrating an example embodiment of generating offset color pixel values with respect to the local window of FIG. 15.

FIG. 15 is a diagram illustrating an example embodiment of a local window when a target pixel corresponds to a red pixel in a Bayer pattern, and FIG. 16 is a diagram illustrating an example embodiment of generating offset color pixel values with respect to the local window of FIG. 15.

Referring to FIG. 15, a local window WIN_R of a 5*5 pixel area may include nine red pixels R, twelve green pixels G and four blue pixels B and the target pixel corresponds to a red pixel R.

For example, denoising may be performed in the domain of the color filter array to enhance the demosaicing performance. In this case, a comparative denoising scheme may use the neighboring pixels corresponding to the same color as the target pixel. According to probability theory, the standard deviation ($\sigma$) of the noise may be reduced by a ratio $\sigma/\sqrt{N}$ where N is the number of pixels used in averaging. Accordingly, the number of pixels used in denoising directly affects the denoising performance.

In the case of the local window WIN_R of FIG. 15, the number of the red pixels corresponding to the color of the target pixel is nine, and the standard deviation of the noise may be reduced by the ratio of 1/3 when the color pixels of the same color as the target pixel are used in denoising. In contrast, all color pixels in the local window WIN_R are used in denoising according to an example embodiment. The number of all color pixels in the local window WIN_R is 25, the standard deviation of the noise may be reduced by the ratio of 1/5, and the denoising performance may be enhanced higher than the comparative scheme. However, the color distortion may be caused when the averages of the respective color pixel values are different from each other. The color distortion may be reduced by considering differences between average color pixel values according to example embodiments.

The distributions of the color pixel values in the local window WIN_R are illustrated in the upper portion of FIG. 16 and the distributions of the offset color pixel values after the conversion according to example embodiments are illustrated in the lower portion of FIG. 16.

As illustrated in FIG. 16, the average values Rm', Gm' and Bm' of the offset color pixel values are equal to a target color average value Rm that is the local color average value corresponding to a color (that is, the red color) of the target pixel (that is, the red pixel R).

When the target pixel is the red pixel R, the conversion of color pixel values to the offset color pixel values may be represented by Expression 5. As a result, the average values per color are the same, and only the variations in the color pixel values per color are different in the distributions of the offset color pixel values as illustrated in the lower portion of FIG. 11. For example, the variation in the color pixel values corresponding to the green pixels may be less than the variation in the color pixel values corresponding to the red and blue pixels.

$$R'=R$$

$$G'=G+\text{OFSrg}$$

$$B'=B+\text{OFSrb}$$

$$\text{OFSrg}=Rm-Gm$$

$$\text{OFSrb}=Rm-Bm \qquad \text{Expression 5}$$

In Expression 5, R, G and B indicate the red pixel value, the green pixel value and the blue pixel value respectively, R', G' and B' indicate the offset red pixel value, the offset green pixel value and the offset blue pixel value respectively, Rm, Gm and Bm indicate the local red average value, the local green average value and the local blue average value respectively, OFSrg and OFSrb indicate a green offset value and a blue offset value respectively when the target pixel is the red pixel.

When denoising is performed using the offset color pixel values that are converted as Expression 5, the offsets due to the color difference may be compensated for, and ideally there remains only the difference due to the variations of the noise distributions. The noise model of the image captured by an image sensor may be represented by Gaussian and Poisson distributions. Accordingly, denoising using the all color pixel values may be validated through the conversion of Expression 5. The average value of the offset color pixel values corresponding to each color may be maintained to be equal to the target color average value that is the local color average value corresponding to the color of the target pixel, and thus the color distortion during denoising may be prevented or reduced.

Figure 17:
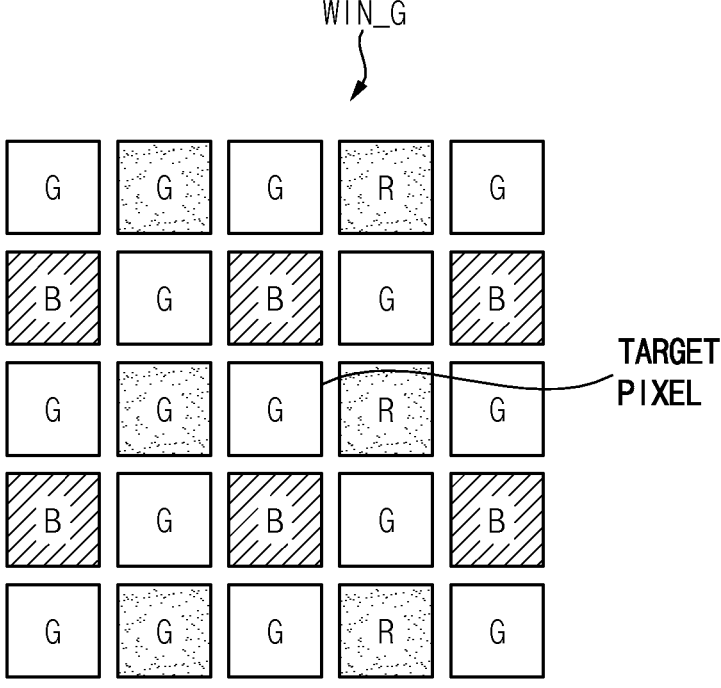
FIG. 17 is a diagram illustrating an example embodiment of a local window when a target pixel corresponds to a green pixel in a Bayer pattern.
Figure 18:
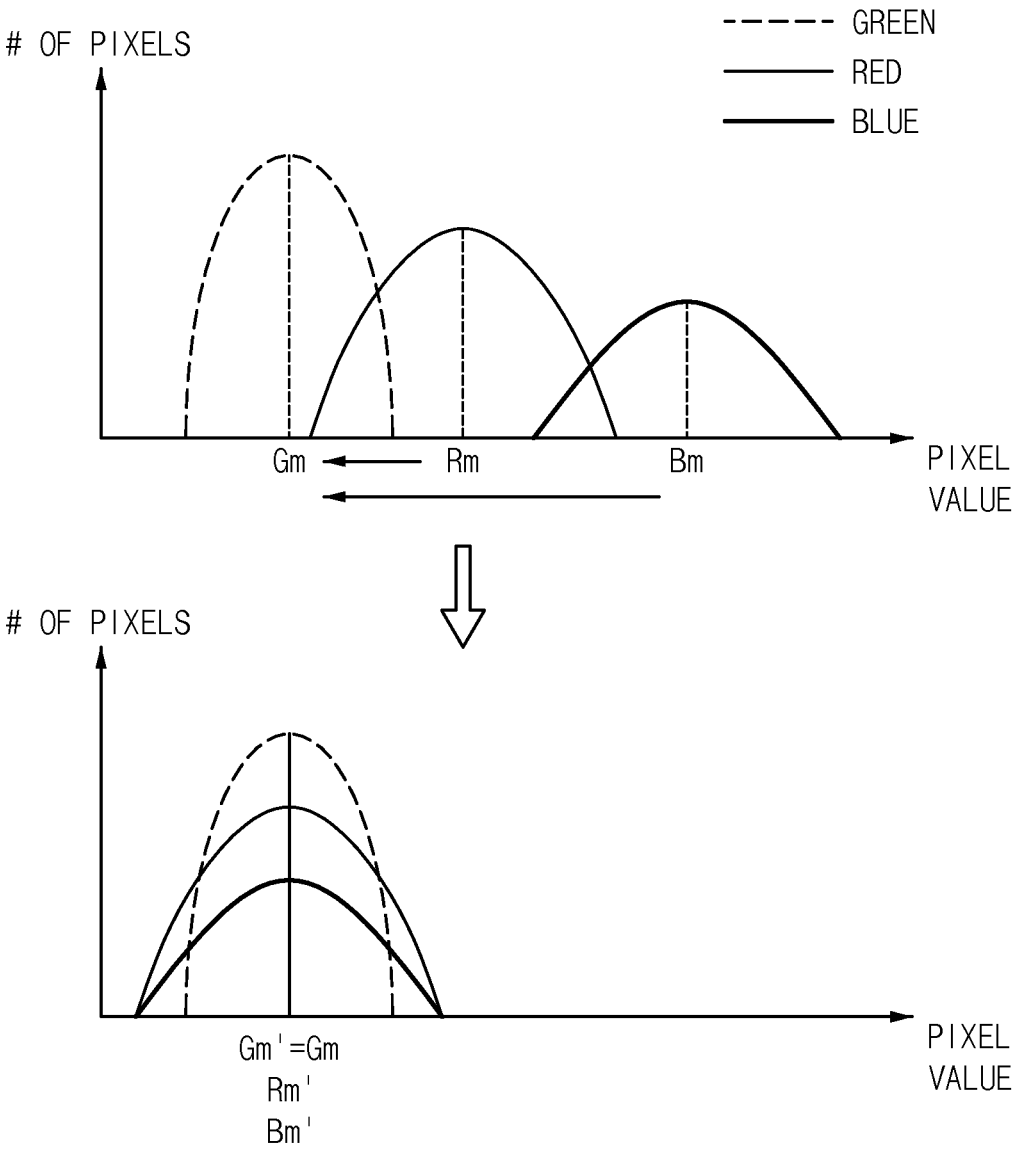
FIG. 18 is a diagram illustrating an example embodiment of generating offset color pixel values with respect to the local window of FIG. 17.

FIG. 17 is a diagram illustrating an example embodiment of a local window when a target pixel corresponds to a green pixel in a Bayer pattern, and FIG. 18 is a diagram illustrating an example embodiment of generating offset color pixel values with respect to the local window of FIG. 17.

Referring to FIG. 17, a local window WIN_G of a 5*5 pixel area may include thirteen green pixels G, six red pixels R and six blue pixels B and the target pixel corresponds to a green pixel G.

The distributions of the color pixel values in the local window WIN_G are illustrated in the upper portion of FIG. 18 and the distributions of the offset color pixel values after the conversion according to example embodiments are illustrated in the lower portion of FIG. 18.

As illustrated in FIG. 18, the average values Rm', Gm' and Bm' of the offset color pixel values are equal to a target color average value Gm that is the local color average value corresponding to a color (that is, the green color) of the target pixel (that is, the green pixel G).

When the target pixel is the green pixel G, the conversion of color pixel values to the offset color pixel values may be represented by Expression 6. As a result, the average values per color are the same and only the variations in the color pixel values per color are different in the distributions of the offset color pixel values as illustrated in the lower portion of FIG. 18. For example, the variation in the color pixel values corresponding to the green pixels may be less than the variation in the color pixel values corresponding to the red and blue pixels.

$$R'=R+\text{OFSgr}$$

$$G'=G$$

$$B'=B+\text{OFSgb}$$

$$\text{OFSgr}=Gm-Rm$$

$$\text{OFSgb}=Gm-Bm \qquad \text{Expression 6}$$

In Expression 6, R, G and B indicate the red pixel value, the green pixel value and the blue pixel value respectively, R', G' and B' indicate the offset red pixel value, the offset green pixel value and the offset blue pixel value respectively, Rm, Gm and Bm indicate the local red average value, the local green average value and the local blue average value respectively, OFSgr and OFSgb indicate a red offset value and a blue offset value when the target pixel is the green pixel.

Figure 19:
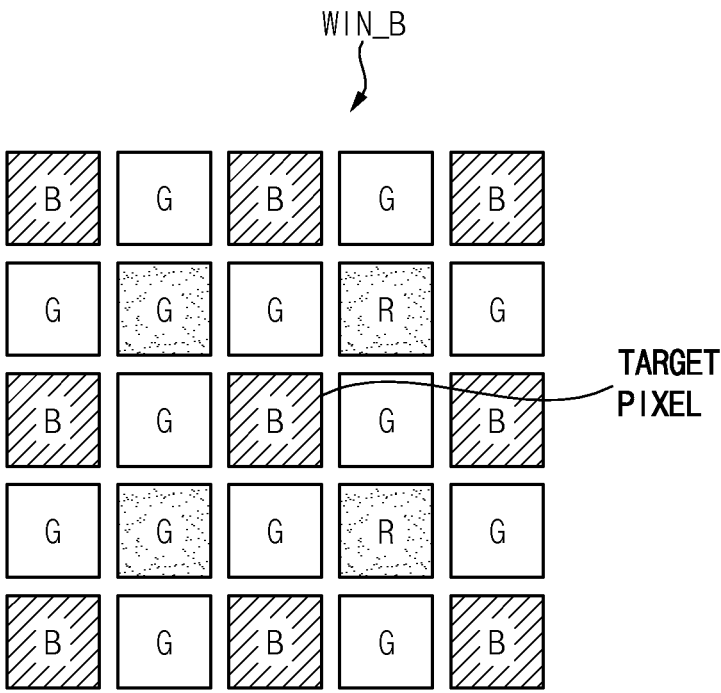
FIG. 19 is a diagram illustrating an example embodiment of a local window when a target pixel corresponds to a blue pixel in a Bayer pattern.
Figure 20:
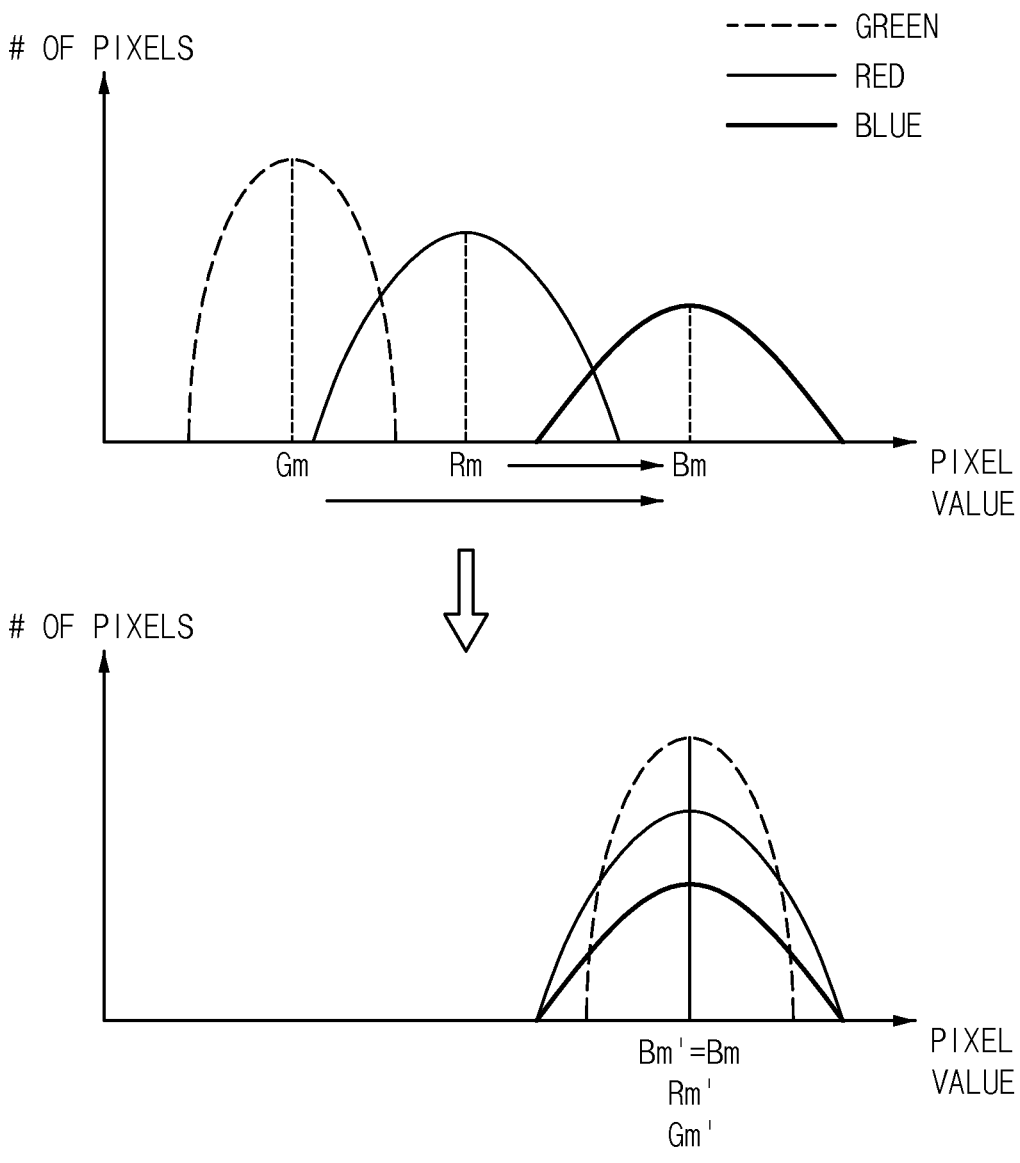
FIG. 20 is a diagram illustrating an example embodiment of generating offset color pixel values with respect to the local window of FIG. 19.

FIG. 19 is a diagram illustrating an example embodiment of a local window when a target pixel corresponds to a blue pixel in a Bayer pattern, and FIG. 20 is a diagram illustrating an example embodiment of generating offset color pixel values with respect to the local window of FIG. 19.

Referring to FIG. 19, a local window WIN_B of a 5*5 pixel area may include nine blue pixels B, four red pixels R and twelve green pixels G and the target pixel corresponds to a blue pixel B.

The distributions of the color pixel values in the local window WIN_B are illustrated in the upper portion of FIG. 20 and the distributions of the offset color pixel values after the conversion according to example embodiments are illustrated in the lower portion of FIG. 20.

As illustrated in FIG. 20, the average values Rm', Gm' and Bm' of the offset color pixel values are equal to a target color average value Bm that is the local color average value corresponding to a color (that is, the blue color) of the target pixel (that is, the blue pixel B).

When the target pixel is the blue pixel B, the conversion of color pixel values to the offset color pixel values may be represented by Expression 7. As a result, the average values per color are the same and only the variations in the color pixel values per color are different in the distributions of the offset color pixel values as illustrated in the lower portion of FIG. 20. For example, the variation in the color pixel values corresponding to the green pixels may be less than the variation in the color pixel values corresponding to the red and blue pixels.

$$R' = R + OFSbr$$

$$G' = G + OFSbg$$

$$B' = B$$

$$OFSbr = Bm - Rm$$

$$OFSbg = Bm - Gm \hspace{3em} \text{Expression 7}$$

In Expression 7, R, G and B indicate the red pixel value, the green pixel value and the blue pixel value respectively, R', G' and B' indicate the offset red pixel value, the offset green pixel value and the offset blue pixel value respectively, Rm, Gm and Bm indicate the local red average value, the local green average value and the local blue average value respectively, OFSbr and OFSbg indicate a red offset value and a green offset value respectively when the target pixel is the blue pixel.

FIG. 21 is a flowchart illustrating a denoising method according to an example embodiment, and FIG. 22 is a block diagram illustrating a denoising circuit according to an example embodiment. A method of FIG. 21 is substantially the same as the method of FIG. 11 and a denoising circuit 101 of FIG. 22 is substantially the same as the denoising circuit 100 of FIG. 13, except for edge detection. The descriptions repeated with respect to FIGS. 11 through 20 may be omitted.

Referring to FIG. 22, a denoising circuit 101 may include an edge detector EDET 90 (e.g., a edge detector circuit), a local window generator LWG 200 (e.g., a local window generator circuit), an average value generator 300 (e.g., an average value generator circuit), a convertor 400 (e.g., a convertor circuit) and a compensator WAG 500 (e.g., a compensator circuit).

Referring to FIGS. 21 and 22, the local window generator 200 sets a local window WIN including a target pixel P(i) and neighboring pixels P(k) adjacent to the target pixel P(i) among color pixels included in an input image IMG (S10), and may provide color pixel values of the target pixel P(i) and the neighboring pixels P(k).

The edge detector 90 generates edge information EMAP by detecting edges in the input image IMG (S15). The average value generator 300 generates local color average values by averaging, color by color, the color pixel values of the target pixel P(i) and the neighboring pixels P(k) included in the local window WIN (S21).

The converter 400 generates offset color pixel values P'(i) and P'(k) by converting the color pixel values of the target pixel P(i) and the neighboring pixels P(k) based on the local color average values Rm, Gm and Bm (S31).

The compensator 500 generates a compensated color pixel value CP(i) of the target pixel P(i) by compensating the color pixel value of the target pixel P(i) based on the edge information EMAP and the offset color pixel values P'(i) and P'(k) (S41).

The edge detector 90 may generate the edge information EMAP corresponding to the input image IMG, and the edge information EMAP may be provided in a form of an edge map. For example, the edge map may be represented such that the pixels corresponding to the edges have the value of '1' and the other pixels have the value of '0'.

The edge detector 90 may be implemented with a filter such as a high-pass filter (HPF) configured to extract the edge information EMAP from the input image IMG. The edge detector 90 may generate the edge information EMAP indicating the edges of the input image IMG using schemes such as Canny edge detection, and so on.

In an example embodiment, the local window generator 200 in FIG. 22 generates an edge grade value EG based on the edge information EMAP and provides the edge grade value EG to the compensator 500. The compensator 500 may generate the compensated color pixel value CP(i) of the target pixel P(i) by compensating the color pixel value of the target pixel P(i) based on the edge grade value EG corresponding to the edge information EMAP and the offset color pixel values P'(i) and P'(k).

In an example embodiment, the compensator 500 generates the compensated color pixel value CP(i) of the target pixel by Expression 8.

$$CP(i) = \frac{\sum_k \omega_i(k) \cdot P'(k) \cdot E_i(k)}{\sum_k \omega_i(k) \cdot E_i(k)} \hspace{2em} \text{Expression 8}$$

$$E_i(k) = \begin{cases} 1 - EG, & \text{if } P(i) \text{ and } P'(k) \text{ correspond to different colors} \\ 1, & \text{if } P(i) \text{ and } P'(k) \text{ correspond to same color} \end{cases}$$

In Expression 8, $\Sigma_k$ indicates a sum with respect to all of the target pixel and the neighboring pixels in the local window, P'(k) indicates each offset color pixel value, $\omega_i(k)$ indicates each weight value corresponding to each offset color pixel value, and EG indicates an edge grade value that is determined during detecting the edges. The edge grade value EG may be determined by units of a color pixel or a local window.

Figure 23:
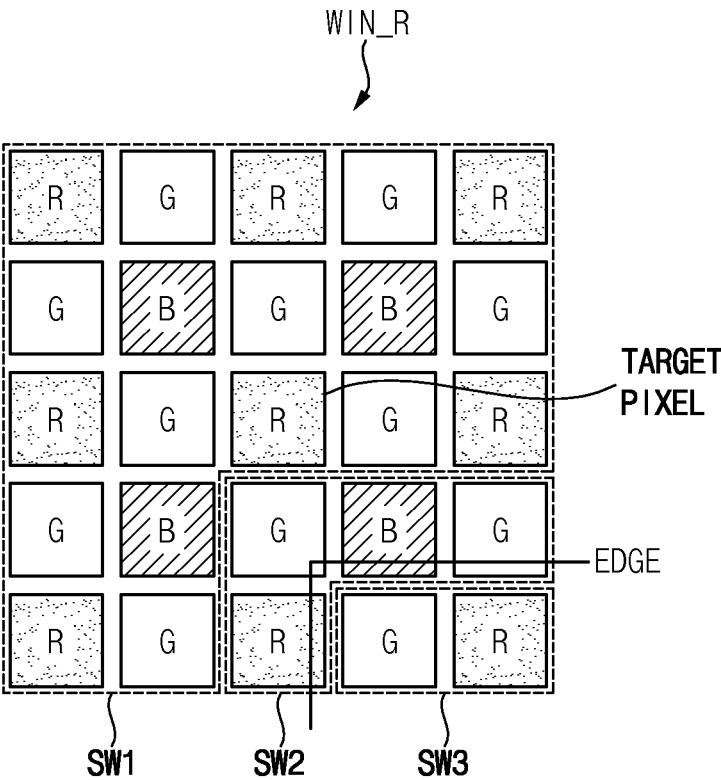
FIG. 23 is a diagram illustrating an example embodiment of a local window when a target pixel corresponds to a red pixel in a Bayer pattern.

FIG. 23 is a diagram illustrating an example embodiment of a local window when a target pixel corresponds to a red pixel in a Bayer pattern.

Referring to FIG. 23, a local window WIN_R of a 5*5 pixel area may include nine red pixels R, twelve green pixels G and four blue pixels B and the target pixel corresponds to a red pixel R.

For example, the local window WIN_R may be divided into sub windows SW1, SW2 and SW3 by the edges as boundaries. In this case, the average value generator 300 in FIG. 22 may generate the local color average values by averaging, color by color, the color pixel values included in a target sub window SW1 in which the target pixel is included. The compensator 500 may generate the compensated color pixel value by compensating the color pixel value of the target pixel based on the offset color pixel values included in the target sub window SW1.

In general, the pixel values are changed relatively largely near the edges. Accordingly, the color pixel values in the sub window SW2 corresponding to the edge and the color pixel values in the sub window SW3 in which the target pixel is not included may be excluded in denoising. For example, sub window SW1 may include the first three rows of pixels, the first two pixels of the fourth row, and the first two pixels of the fifth row. For example, sub window SW2 may include the last three pixels of the fourth row and the third pixel of the fifth row. For example, sub window SW3 may include the last two pixels of the fifth row.

Figure 24:
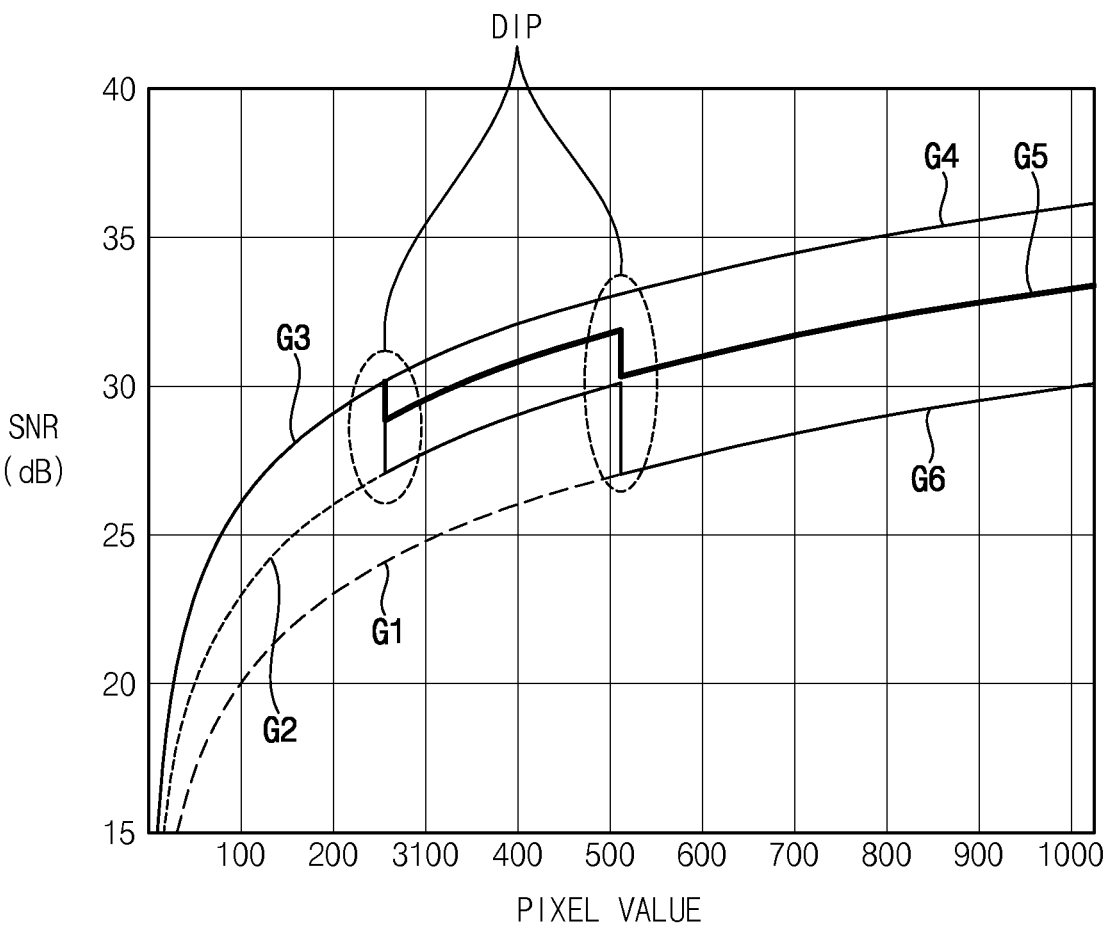
FIG. 24 is a diagram illustrating reduction of signal-to-noise ratio (SNR) dip by a method of processing images according to an example embodiment.

FIG. 24 is a diagram illustrating reduction of signal-to-noise ratio (SNR) dip by a method of processing images according to an example embodiment.

FIG. 24 shows signal-to-noise ratios (SNRs) according to pixel values of each image. G1 corresponds to a short exposure image, G2 corresponds to a medium exposure image, G3 corresponds to a long exposure image, and G4 corresponds to an ideal HDR image. G5 corresponds to an HDR image when denoising is performed before processing according to example embodiments, and G6 corresponds to an HDR image when denoising is not performed before HDR processing.

When exposure noise images IES, IEM and IEL corresponding to different exposure times are synthesized, a relatively large SNR dip occurs as shown in G6 of FIG. 24. On the other hand, when denoising is performed before HDR processing according to example embodiments, the SNR dip may be reduced as in G5 of FIG. 24. Through the reduction of the SNR dip, the heterogeneity caused by the SNR dip may be reduced and the quality of the HDR image may be increased.

Figure 25B:
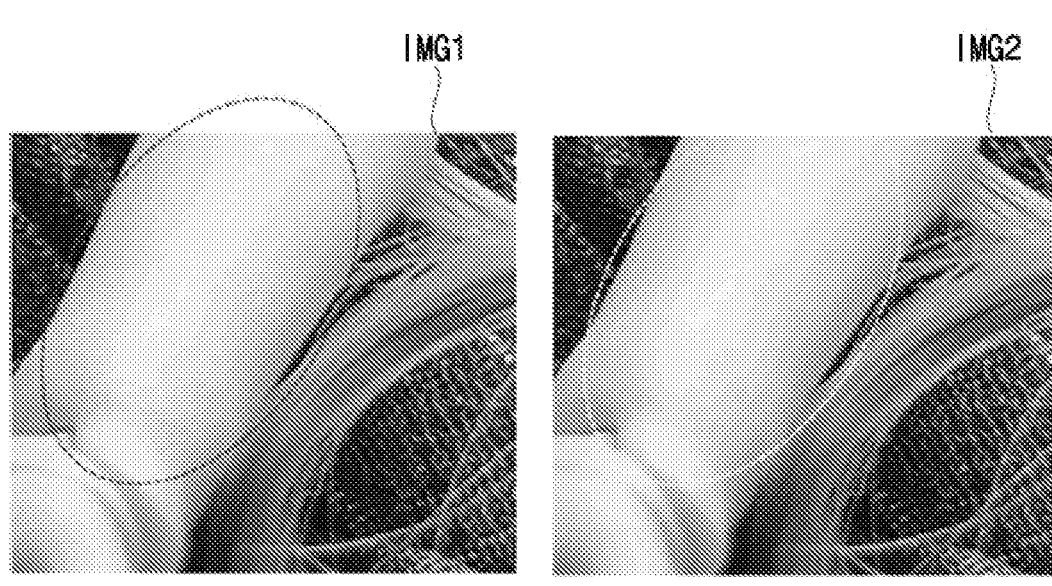

FIGS. 25A and 25B are diagrams illustrating enhancement of image quality by a method of processing images according to example embodiments.

FIG. 25A shows an image processing procedure according to embodiments of the present invention. In FIG. 25A, IES, IEM and IES are the exposure noise images corresponding to different brightness levels (e.g., different exposure times), and WTM is a weight map corresponding to the exposure noise images IES, IEM and IEL, IHDR is an HDR image that is generated by merging the exposure noise images IES, IEM and IEL. In FIG. 25B, a first image IMG1 is an HDR image when denoising is not performed before HDR processing, and a second image IMG2 is an HDR image when denoising is performed before HDR processing according to example embodiments. As shown in FIG. 25B, the image quality of the region of interest ROI may be increased by the image processing method according to example embodiments.

Figure 26:
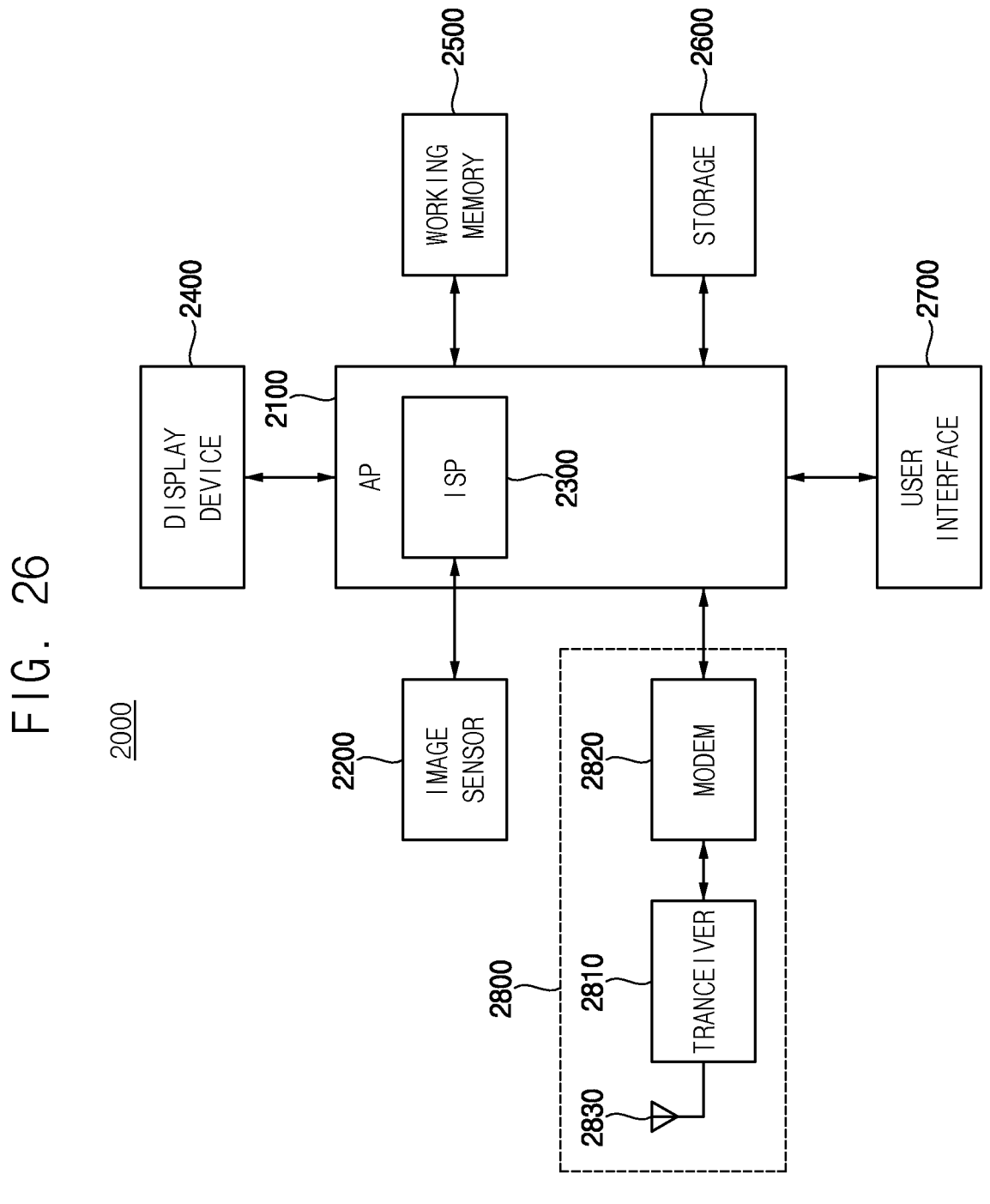
FIG. 26 is a block diagram illustrating a system according to an example embodiment.

FIG. 26 is a block diagram illustrating a system according to an example embodiment.

Referring to FIG. 26, the image processing device 2000 according to an example embodiment includes an application processor (AP) 2100, an image sensor 2200, a display device 2400, a working memory 2500, a storage 2600, a user interface 2700, and/or a wireless transceiver 2800. The application processor 2100 may include an image signal processor (ISP) 2300. The image signal processor 10 of FIG. 1 may be applied as the image signal processor 2300 of FIG. 26. In an example embodiment, the image signal processor 10 is implemented as a separate integrated circuit independently from the application processor 2100.

The application processor 2100 may control an overall operation of the image processing device 2000 and may be provided as system-in-chip (SoC) which drives an application program and an operating system (OS).

The application processor 2100 may control an operation of the image signal processor 2300 and may provide or store converted image data, generated by the image signal processor 2300, to the display device 2400 or in the storage 2600.

The image sensor 2200 may generate image data (for example, raw image data) based on a received light signal and may provide the image data to the image signal processor 2300.

The image signal processor 2300 may receive a plurality of commands from a processor in the AP 2100, and perform the image processing of a plurality of image units corresponding to the plurality of commands, and perform interrupt control.

The working memory 2500 may be implemented as a volatile memory such as dynamic random access memory (DRAM) or static random access memory (SRAM) or a non-volatile resistive memory such as ferroelectric random access memory (FeRAM), resistive random access memory (RRAM), or phase-change memory (PRAM). The working memory 2500 may store programs and/or data each processed or executed by the application processor 2100.

The storage 2600 may be implemented as a non-volatile memory device such as NAND flash or a resistive memory, and for example, may be provided as a memory card (for example, MMC, eMMC, SD, or micro SD). The storage 2600 may store data and/or a program which correspond(s) to an execution algorithm for controlling an image processing operation of the image signal processor 2300, and when the image processing operation is performed, the data and/or the program may be loaded into the working memory 2500. In an example embodiment, the storage 2600 stores image data (for example, converted image data or post-processed image data) generated by the image signal processor 2300.

The user interface 2700 may be implemented with various devices, such as a keyboard, a key panel, a touch panel, a fingerprint sensor, and a microphone, for receiving a user input. The user interface 2700 may receive the user input and may provide the application processor 2100 with a signal corresponding to the received user input.

The wireless transceiver 2800 may include a transceiver 2810, a modem 2820, and an antenna 2830.

As described above, the image signal processor and the image processing method according to example embodiments may reduce the signal-to-noise ratio (SNR) dip of the HDR image and improve the quality of HDR image by reducing the noise of the plurality of exposure noise images before merging images. In addition, the image signal processor and image processing method according to example embodiments may increase the quality of the HDR image while minimizing an increase in hardware cost through efficient control of the line buffers used when merging images. In the case of the single noise image, the noise reduction performance may be further increased by increasing the number of the buffered data lines.

The present disclosure may be applied to electronic devices and systems requiring image processing. For example, the present disclosure may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IOT) device, an internet of everything (IoE) device, an e-book, a virtual reality (VR) device, an augmented reality (AR) device, a vehicle navigation device, a video phone, a monitoring system, an auto focusing system, a tracking system, a motion detection system, an automotive driving system, etc.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. An image signal processor comprising:
a noise reduction circuit configured to perform a noise reduction operation on a plurality of exposure noise images each respectively corresponding to one of a plurality of brightness levels to generate a plurality of exposure clean images in a first operation mode and configured to perform the noise reduction operation with respect to a single noise image corresponding to one brightness level to generate a single clean image in a second operation mode;
a high dynamic range (HDR) circuit configured to merge the plurality of exposure clean images to generate an HDR image in the first operation mode; and
a post-processing circuit configured to generate an output image by processing the HDR image in the first operation mode and processing the single clean image in the second operation mode,
wherein the HDR circuit does not buffer data lines of the plurality of exposure clean images in the first operation mode such that the HDR circuit generates an n-th data line of the HDR image on the fly by merging n data lines of the plurality of exposure clean images, where n is a natural number.

2. The image signal processor of claim 1, wherein the HDR circuit is enabled in the first operation mode and is disabled in the second operation mode.

3. The image signal processor of claim 1, wherein the noise reduction circuit comprises:
a line buffer control circuit configured to buffer and output the plurality of exposure noise images in units of data lines in the first operation mode; and
a plurality of denoising circuits configured to respectively receive the plurality of exposure noise images from the line buffer control circuit to generate the plurality of exposure clean images in the first operation mode.

4. The image signal processor of claim 3, wherein the line buffer control circuit buffers and outputs the single noise image in units of data lines in the second operation mode,
wherein one denoising circuit among the plurality of denoising circuits is enabled in the second operation mode such that the one denoising circuit receives the single noise image from the line buffer control circuit and generates the single clean image in the second operation mode, and
wherein other denoising circuits except the one denoising circuit among the plurality of denoising circuits are disabled in the second operation mode.

5. An image signal processor comprising:
a noise reduction circuit configured to perform a noise reduction operation on a plurality of exposure noise images each respectively corresponding to one of a plurality of brightness levels to generate a plurality of exposure clean images in a first operation mode and configured to perform the noise reduction operation with respect to a single noise image corresponding to one brightness level to generate a single clean image in a second operation mode, the noise reduction circuit comprising:
a line buffer control circuit configured to buffer and output the plurality of exposure noise images in units of data lines in the first operation mode, and
a plurality of denoising circuits configured to respectively receive the plurality of exposure noise images from the line buffer control circuit to generate the plurality of exposure clean images in the first operation mode;
a high dynamic range (HDR) circuit configured to merge the plurality of exposure clean images to generate an HDR image in the first operation mode; and
a post-processing circuit configured to generate an output image by processing the HDR image in the first operation mode and processing the single clean image in the second operation mode,
wherein the line buffer control circuit comprises:
a plurality of buffer groups configured to respective store data lines of the plurality of exposure noise images in the first operation mode.

6. The image signal processor of claim 5, wherein the line buffer control circuit stores data lines of the single noise image in at least two buffer groups among the plurality of buffer groups in the second operation mode.

7. The image signal processor of claim 1, wherein the noise reduction circuit reduces noise in the plurality of exposure noise images with a first noise reduction performance in the first operation mode and reduces noise in the single noise image with a second noise reduction performance higher than the first noise reduction performance in the second operation mode.

8. The image signal processor of claim 1, wherein the HDR circuit comprises:
a normalizing circuit configured to generate a plurality of normalized noise images by increasing a size of pixel data of the plurality of exposure noise images and generate a plurality of normalized clean images by increasing a size of pixel data of the plurality of exposure clean images in the first operation mode;
a weight generation circuit configured to generate weight values based on the plurality of normalized noise images in the first operation mode; and
a merging circuit configured to generate the HDR image by merging the plurality of normalized clean images based on the weight values in the first operation mode.

9. The image signal processor of claim 8, wherein the normalizing circuit receives n data lines of the plurality of exposure noise images before receiving n data lines of the plurality of exposure clean images and outputs n data lines of the plurality of normalized noise images before outputting n data lines of the plurality of normalized clean images, where n is a natural number.

10. The image signal processor of claim 8, wherein the merging circuit receives the n data lines of the plurality of normalized clean images from the normalizing circuit and simultaneously receives the weight values corresponding to the n data lines of a plurality of normalized noise data lines from the weight generation circuit.

11. The image signal processor of claim 1, wherein the noise reduction circuit comprises:

a plurality of denoising circuits configured to respectively receive the plurality of exposure noise images corresponding to a color filter array of an image sensor and respectively generate the plurality of exposure clean images in the first operation mode.

12. The image signal processor of claim 11, wherein each denoising circuit of the plurality of denoising circuits comprises:

a local window generator circuit configured to set a local window including a target pixel and neighboring pixels adjacent to the target pixel among color pixels included in an input image;

an average value generator circuit configured to generate local color average values by averaging, color by color, color pixel values of the target pixel and the neighboring pixels included in the local window;

a converter circuit configured to generate offset color pixel values by converting the color pixel values of the target pixel and the neighboring pixels based on the local color average values; and a compensator circuit configured to generate a compensated color pixel value of the target pixel by adjusting the color pixel value of the target pixel based on the offset color pixel values.

13. The image signal processor of claim 12, wherein each denoising circuit generates the compensated color pixel value of the target pixel based on all of the color pixel values corresponding to a same color as the target pixel and the color pixel values corresponding to colors different from the color of the target pixel.

14. The image signal processor of claim 12, wherein an average value of the offset color pixel values corresponding to each color is equal to a target color average value, wherein the target color average value is the local color average value corresponding to the color of the target pixel.

15. The image signal processor of claim 12, wherein the converter circuit comprises:

an offset generator circuit configured to generate each of a plurality of color offset values by subtracting each of the local color average values from a target color average value, wherein the target color average value is the local color average value corresponding to the color of the target pixel; and a pixel value converting circuit configured to generate each of the offset color pixel values by adding each of the color pixel values of the target pixel and the neighboring pixels to each of the color offset values.

16. The image signal processor of claim 12, wherein each denoising circuit further comprises:

an edge detector circuit configured to generate edge information by detecting edges in the input image, wherein the compensated color pixel value of the target pixel is generated by adjusting the color pixel value of the target pixel based on the edge information in addition to the offset color pixel values.

17. An image signal processor comprising:

a line buffer control circuit configured to buffer and output a plurality of exposure noise images each respectively corresponding one of a plurality of brightness levels in units of data lines in a first operation mode and buffer and output a single noise image corresponding to one brightness level in units of data lines in a second operation mode;

a plurality of denoising circuits configured to respectively receive the plurality of exposure noise images from the line buffer control circuit to generate a plurality of exposure clean images in the first operation mode, and configured to receive the single noise image from the line buffer control circuit and generate a single clean image in the second operation mode;

a normalizing circuit configured to generate a plurality of normalized noise images by increasing a size of pixel data of the plurality of exposure noise images and generate a plurality of normalized clean images by increasing a size of pixel data of the plurality of exposure clean images in the first operation mode;

a weight generation circuit configured to generate weight values based on the plurality of normalized noise images in the second operation mode;

a merging circuit configured to generate a high dynamic range (HDR) image by merging the plurality of normalized clean images based on the weight values in the first operation mode; and a post-processing circuit configured to generate an output image by processing the HDR image in the first operation mode and processing the single clean image in the second operation mode.

18. The image signal processor of claim 17, wherein an HDR circuit is enabled in the first operation mode and is disabled in the second operation mode.

* * * * *